US012406619B2

(12) United States Patent
Hu

(10) Patent No.: US 12,406,619 B2
(45) Date of Patent: Sep. 2, 2025

(54) DISPLAY PANEL AND DISPLAY APPARATUS

(71) Applicant: Tianma Advanced Display Technology Institute (Xiamen) Co., Ltd., Fujian (CN)

(72) Inventor: Yuqi Hu, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 18/792,582

(22) Filed: Aug. 2, 2024

(65) Prior Publication Data

US 2024/0395193 A1 Nov. 28, 2024

(51) Int. Cl.
*G09G 3/32* (2016.01)

(52) U.S. Cl.
CPC ....... *G09G 3/32* (2013.01); *G09G 2300/0426* (2013.01); *G09G 2300/0842* (2013.01); *G09G 2300/0861* (2013.01); *G09G 2310/08* (2013.01); *G09G 2320/0233* (2013.01); *G09G 2320/0242* (2013.01); *G09G 2320/041* (2013.01)

(58) Field of Classification Search
None
See application file for complete search history.

(56) References Cited

U.S. PATENT DOCUMENTS

2022/0165210 A1* 5/2022 Yoon ........................ G09G 5/10

FOREIGN PATENT DOCUMENTS

CN 112767873 A 5/2021

* cited by examiner

*Primary Examiner* — Christopher J Kohlman
(74) *Attorney, Agent, or Firm* — Wiersch Law Group

(57) ABSTRACT

Display panel and display apparatus are provided. Pixel circuit in display panel includes drive transistor, first light-emitting control module, and second light-emitting control module. In first pixel circuit, control terminal of first light-emitting control module receives first control signal, and control terminal of second light-emitting control module receives second control signal. In second pixel circuit, both control terminal of first light-emitting control module and control terminal of second light-emitting control module receive first control signal or receive second control signal. In first mode, first control signal and second control signal are different control signals. In working cycle of first pixel circuit, effective pulse period of first control signal partially overlaps with an effective pulse period of second control signal. The present disclosure can make different light-emitting devices achieve different light-emitting durations, thereby compensating differences of different light-emitting devices in luminous efficiency.

20 Claims, 21 Drawing Sheets

DISPLAY PANEL AND DISPLAY APPARATUS

CROSS-REFERENCE TO RELATED APPLICATIONS

The present application claims priority to Chinese Patent Application CN 202410674360.3, filed on May 28, 2024, the content of which is incorporated herein by reference in its entirety.

TECHNICAL FIELD

The present disclosure relates to the field of display technologies, and in particular to a display panel and a display apparatus.

BACKGROUND

Micro light-emitting diodes (Micro LEDs) and Mini light-emitting diodes (Mini LEDs) will become mainstream technologies to future display products for high luminous efficiency, high luminance, wide color gamut (WCG) and low power consumption. To realize color display, a red LED, a green LED and a blue LED are to be used. Since devices of different colors are varied in luminous efficiency, the structure of a pixel circuit for driving the LEDs is of great importance to the display effect.

SUMMARY

Embodiments of the present disclosure provide a display panel and a display apparatus, to improve the display effect.

According to a first aspect, an embodiment of the present disclosure provides a display panel. The display panel includes a plurality of pixel circuits and a plurality of light-emitting devices. The pixel circuits each include a drive transistor, a first light-emitting control module, and a second light-emitting control module. The drive transistor includes a first electrode coupled to a first power terminal through the first light-emitting control module, and a second electrode coupled to the light-emitting device through the second light-emitting control module.

The pixel circuits include a first pixel circuit and a second pixel circuit. In the first pixel circuit, a control terminal of the first light-emitting control module receives a first control signal, and a control terminal of the second light-emitting control module receives a second control signal. In the second pixel circuit, both a control terminal of the first light-emitting control module and a control terminal of the second light-emitting control module receive the first control signal or receive the second control signal.

The display panel includes a first mode. In the first mode, the first control signal and the second control signal are different control signals. In a working cycle of the first pixel circuit, an effective pulse period of the first control signal partially overlaps with an effective pulse period of the second control signal.

According to a second aspect, based on a same inventive concept, an embodiment of the present disclosure provides a display apparatus, the display panel includes a plurality of pixel circuits and a plurality of light-emitting devices. The pixel circuits each include a drive transistor, a first light-emitting control module, and a second light-emitting control module. The drive transistor includes a first electrode coupled to a first power terminal through the first light-emitting control module, and a second electrode coupled to the light-emitting device through the second light-emitting control module. The pixel circuits include a first pixel circuit and a second pixel circuit. In the first pixel circuit, a control terminal of the first light-emitting control module receives a first control signal, and a control terminal of the second light-emitting control module receives a second control signal. In the second pixel circuit, both a control terminal of the first light-emitting control module and a control terminal of the second light-emitting control module receive the first control signal or receive the second control signal. The display panel includes a first mode. In the first mode, the first control signal and the second control signal are different control signals. In a working cycle of the first pixel circuit, an effective pulse period of the first control signal partially overlaps with an effective pulse period of the second control signal.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person skilled in the art may still derive other drawings from these accompanying drawings without creative efforts.

DESCRIPTION OF EMBODIMENTS

To make the objectives, technical solutions, and advantages of the embodiments of the present disclosure clearer, the technical solutions in the embodiments of the present disclosure will be clearly and completely described below with reference to the accompanying drawings in the embodiments of the present disclosure. Apparently, the described embodiments are some rather than all of the embodiments of the present disclosure. All other embodiments obtained by those of ordinary skill in the art based on the embodiments of the present disclosure without creative efforts should fall within the protection scope of the present disclosure.

Terms used in the embodiments of the present disclosure are only for the purpose of describing specific embodiments, and are not intended to limit the present disclosure. Unless otherwise specified in the context, words, such as “a”, “the”, and “this”, in a singular form in the embodiments of the present disclosure and the appended claims include plural forms.

LEDs of different colors are made of light-emitting materials of different colors. Affected by the materials, the LEDs of different colors are varied in luminous efficiency. Moreover, the light-emitting materials of the LEDs are affected by a temperature largely. At different temperatures, the LEDs are varied in luminous efficiency. The temperature poses different influences on the luminous efficiency of the LEDs of different colors, thereby causing color shift in display. For example, by testing, compared with a working environment at 25° C., when the display panel works at a high temperature (such as 85° C.), luminous efficiency of a red LED, a green LED and a blue LED is reduced to different extents. This causes color shift and luminance drop.

In order to solve problems in the related art, an embodiment of the present disclosure provides a display panel. In the display panel, pixel circuits are coupled to light-emitting devices. By designing a manner for controlling different pixel circuits, the present disclosure can make light-emitting devices driven by the different pixel circuits achieve different light-emitting durations, thereby compensating differences of the different light-emitting devices in luminous efficiency, and improving a display effect of the display panel.

Figure 1:
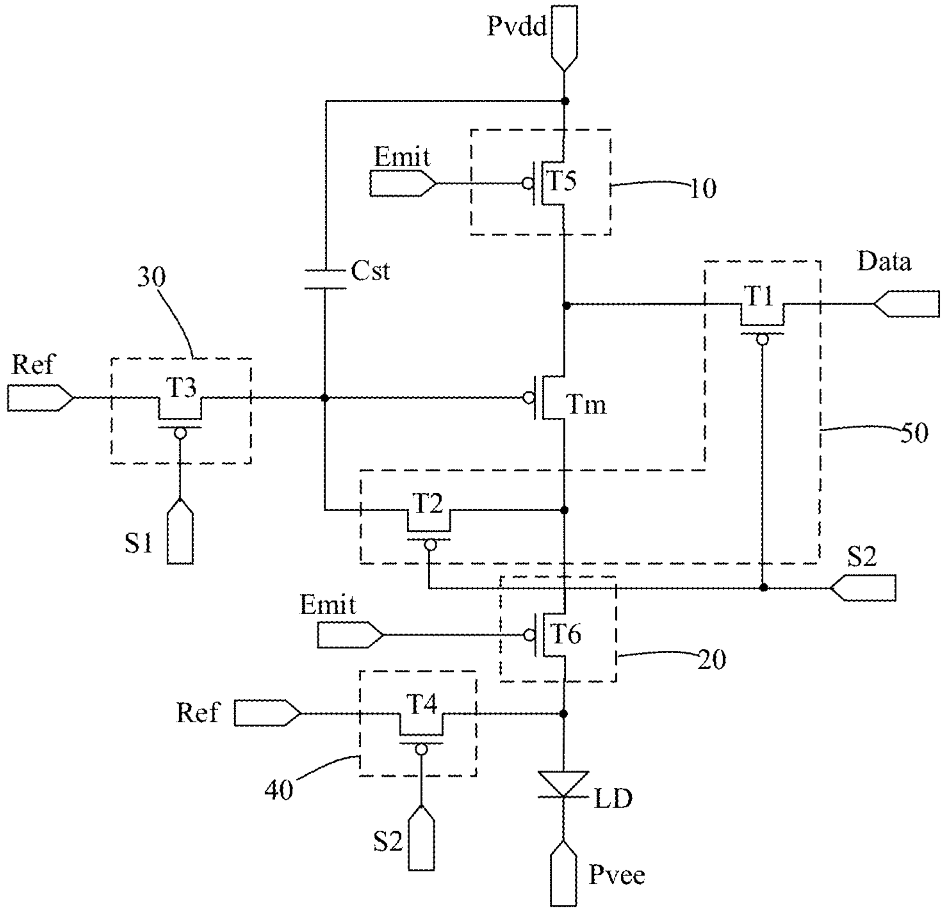
FIG. 1 is a schematic diagram of a pixel circuit according to an embodiment of the present disclosure.

FIG. 1 is a schematic diagram of a pixel circuit according to an embodiment of the present disclosure. As shown in FIG. 1, the pixel circuit includes a drive transistor Tm, a first light-emitting control module 10, a second light-emitting control module 20, a gate reset module 30, an electrode reset module 40, and a data writing module 50. The drive transistor Tm includes a first electrode coupled to a first power terminal Pvdd through the first light-emitting control module 10, and a second electrode coupled to one electrode of a light-emitting device LD through the second light-emitting control module 20. The other electrode of the light-emitting device LD is coupled to a second power terminal Pvee. A storage capacitor Cst includes one electrode plate coupled to the first power terminal Pvdd, and the other electrode plate coupled to a gate of the drive transistor Tm. As can be seen from FIG. 1, the gate reset module 30 is controlled by a first scan signal S1, the data writing module 50 and the electrode reset module 40 are controlled by a second scan signal S2, and the first light-emitting control module 10 and the second light-emitting control module 20 are controlled by a light-emitting control signal Emit. The light-emitting device LD is an LED, such as a Micro LED or a Mini LED.

Figure 2:
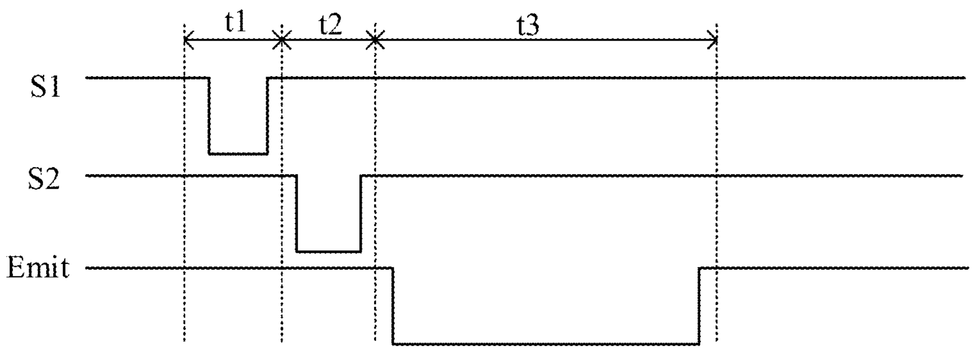
FIG. 2 is a timing diagram of the pixel circuit shown in FIG. 1.

FIG. 2 is a timing diagram of the pixel circuit shown in FIG. 1. As shown in FIG. 2, a working cycle of the pixel circuit includes a gate reset stage t1, a data writing stage t2, and a light-emitting stage t3. In the gate reset stage t1, the gate reset module 30 is turned on to write a reset signal Ref (having a same reference sign as its signal terminal) provided by a reset signal terminal Ref into the gate of the drive transistor Tm, thereby resetting the gate of the drive transistor Tm. In the data writing stage t2, the data writing module 50 is turned on to write a data voltage Data into the gate of the drive transistor Tm, and the electrode reset module 40 is turned on to reset the electrode of the light-emitting device LD with the reset signal Ref. In the light-emitting stage t3, the first light-emitting control module 10 and the second light-emitting control module 20 are turned on, the drive transistor Tm is turned on under the control of a voltage at the gate of the drive transistor, the pixel circuit provides a driving current for the light-emitting device LD, and the light-emitting device LD emits light under the control of a light-emitting current.

Optionally, as shown in FIG. 1, the data writing module 50 includes a data writing transistor T1 and a compensation transistor T2. The gate reset module 30 includes a gate reset transistor T3. The electrode reset module 40 includes an electrode reset transistor T4. The first light-emitting control module 10 includes a first light-emitting control transistor T5. The second light-emitting control module 20 includes a second light-emitting control transistor T6.

In some embodiments, the electrode reset transistor may also not be provided in the pixel circuit.

In FIG. 1, the transistors in the pixel circuit are all p-type transistors for illustration. In other embodiments, the transistors are all n-type transistors. In other embodiments, at least one of the gate reset transistor T3 and the compensation transistor T2 is an n-type transistor, and a remaining transistor is a p-type transistor. When the compensation transistor T2 is the n-type transistor, and the data writing transistor T1 is the p-type transistor, it may be understood that both the compensation transistor and the data writing transistor are controlled by different signals. In the accompanying drawings of the following embodiments, the transistors in the pixel circuit are all p-type transistors only for illustration.

FIG. 1 illustrates a basic structure of the pixel circuit. In the embodiment of FIG. 1, the first light-emitting control module 10 and the second light-emitting control module 20 are controlled by a same signal. In the embodiment of the present disclosure, by designing a manner for controlling the first light-emitting control module 10 and the second light-emitting control module 20 in different pixel circuits, durations that the different pixel circuits provide a driving current for the light-emitting devices LD in the light-emitting stage are different, and light-emitting durations of the light-emitting devices LD driven by the different pixel circuits are different, thereby compensating differences of the light-emitting devices LD in luminous efficiency, and improving the display effect.

Figure 3:
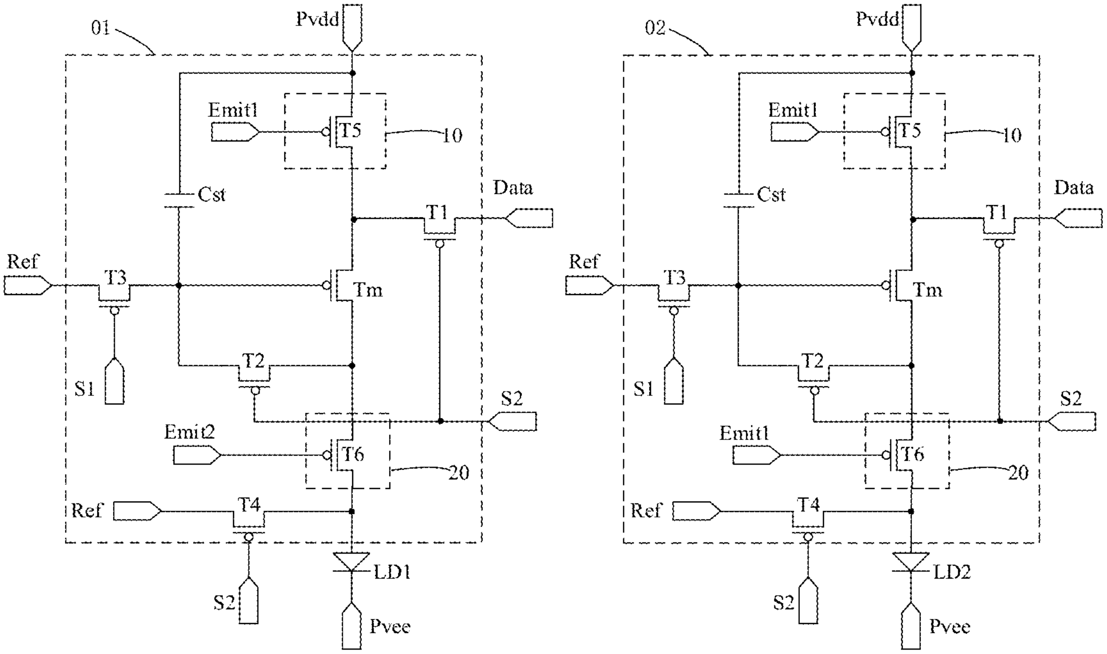
FIG. 3 is a schematic diagram of a pixel circuit in a display panel according to an embodiment of the present disclosure.

FIG. 3 is a schematic diagram of a pixel circuit in a display panel according to an embodiment of the present disclosure. FIG. 3 illustrates a first pixel circuit 01 and a second pixel circuit 02 in the pixel circuits. The first pixel circuit 01 is coupled to a first light-emitting device LD1, and the second pixel circuit 02 is coupled to a second light-emitting device LD2. As shown in FIG. 3, in the first pixel circuit 01, a control terminal of the first light-emitting control module 10 receives a first control signal Emit 1, and a control terminal of the second light-emitting control module 20 receives a second control signal Emit 2. In the second pixel circuit 02, both a control terminal of the first light-emitting control module 10 and a control terminal of the second light-emitting control module 20 receive the first control signal Emit 1 or receive the second control signal Emit 2, and receive the first control signal Emit 1 in FIG. 3 for illustration.

Signal lines, such as a data line, a scanning line, a light-emitting control line and a power line, are arranged in the display panel. The data voltage Data is provided by the data line. The first scan signal S1 is provided by a first scanning line. The second scan signal S2 is provided by a second scanning line. The power line serves as the first power terminal Pvdd, and provides a first power voltage Pvdd (the power terminal and the voltage signal provided by the power terminal use the same reference sign). The first control signal Emit 1 and the second control signal Emit 2 are respectively provided by corresponding light-emitting control lines.

For ease of understanding on the solution, explanations are made to some terms used herein. In the embodiment of the present disclosure, the term "effective level of a signal" refers to a level required when a module controlled by the signal is turned on. In some embodiments, the effective level is a low level. In other embodiments, the effective level is a high level. The term "effective pulse of a signal" refers to a pulse signal when a module controlled by the signal is turned on. For example, in the first pixel circuit 01, if the first light-emitting control module 10 is controlled by the first control signal Emit 1, and the first light-emitting control module 10 is turned on under the control of a low-level pulse of the first control signal Emit 1, the low-level pulse of the first control signal Emit 1 is the effective pulse of the first control signal, and the low level is the effective level. A width (or a duration) of the effective pulse refers to an effective pulse width, and may also be called a duration of the effective pulse. The term "different control signals" refers to that the signals have different effective pulse widths, namely durations of effective pulses of the signals are different.

In the embodiment of the present disclosure, the first light-emitting device LD1 and the second light-emitting device LD2 respectively driven by the first pixel circuit 01 and the second pixel circuit 02 may be located on a same pixel row, and may also be located on different pixel rows.

It may be understood that when the first pixel circuit 01 and the second pixel circuit 02 respectively drive light-emitting devices on a same pixel row, the first scan signal S1 received by the first pixel circuit and the second pixel circuit is an effective level in same periods, the second scan signal S2 received by the first pixel circuit and the second pixel circuit is an effective level in same periods, and the first control signals Emit 1 received by the first pixel circuit and the second pixel circuit is an effective level in same periods.

It may be understood that when the first pixel circuit 01 and the second pixel circuit 02 respectively drive light-emitting devices on different pixel rows, a duration when the first pixel circuit receives the first scan signal S1 as an effective level and a duration when the second pixel circuit receives the first scan signal as an effective level are the same, with a difference in starting time point of the effective level. Generally, a plurality of pixel rows in the display panel are driven one by one, and a scan signal is provided by cascaded shift registers for a plurality of scanning lines row by row, so there is a difference between periods when pixel circuits for driving different pixel rows receive an effective level of the scan signal. Correspondingly, for the first control signal Emit 1, a duration when the first pixel circuit 01 receives the effective level of the first control signal Emit 1 and a duration when the second pixel circuit 02 receives the effective level of the first control signal are the same, with a difference in starting time point of the effective level.

With reference to descriptions on the pixel circuit in the embodiment of FIG. 1, it may be understood that in the light-emitting stage t3, when the first light-emitting control module 10 is turned on, the first electrode of the drive transistor Tm and the first power terminal Pvdd are connected. When the second light-emitting control module 20 is turned on, the second electrode of the drive transistor Tm and the light-emitting device LD are connected. When both the first light-emitting control module 10 and the second light-emitting control module 20 are turned on, the drive transistor Tm generates a driving current and provides the driving current for the light-emitting device LD, and thus the light-emitting device LD emits light. That is, in the light-emitting stage t3, when the first light-emitting control module 10 and the second light-emitting control module 20 are turned on at the same time, a light-emission channel can be formed and thus the light-emitting device LD emits the light. In the embodiment of the present disclosure, by controlling different durations for turning on the first light-emitting control module 10 and the second light-emitting control module 20 in different pixel circuits, light-emission durations of the light-emitting devices controlled by the different pixel circuits can be different.

In the embodiment of the present disclosure, the display panel includes a first mode. In the first mode, the first control signal Emit 1 and the second control signal Emit 2 are different control signals. That is, an effective pulse width of the first control signal Emit 1 is different from an effective pulse width of the second control signal Emit 2. In a working cycle of the first pixel circuit 01, an effective pulse period of the first control signal Emit 1 partially overlaps with an effective pulse period of the second control signal Emit 2. The overlap herein refers to that two control signals provide an effective level in a certain period. It may be understood that in the working cycle of the first pixel circuit 01, in the period when the effective pulse of the first control signal Emit 1 overlaps with the effective pulse of the second control signal Emit 2, the first pixel circuit 01 can provide a driving current, such that the first light-emitting device LD1 emits light.

According to the display panel provided by the embodiment of the present disclosure, in the first pixel circuit 01, the control terminal of the first light-emitting control module 10 and the control terminal of the second light-emitting control module 20 respectively receive the first control signal Emit 1 and the second control signal Emit 2. In the second pixel circuit 02, both the control terminal of the first light-emitting control module 10 and the control terminal of the second light-emitting control module 20 receive the first control signal Emit 1 or receive the second control signal Emit 2. In the light-emitting stage of the first pixel circuit 01, a duration when the first pixel circuit provides the driving current is at least controlled by the first control signal Emit 1 and the second control signal Emit 2. In the light-emitting stage of the second pixel circuit 02, a duration when the second pixel circuit provides the driving current is only controlled by either the first control signal Emit 1 or the second control signal Emit 2. The duration when the first pixel circuit 01 provides the driving current and the duration when the second pixel circuit 02 provides the driving current are different in the first mode. The present disclosure can make different light-emitting devices achieve different light-emitting durations, thereby compensating differences of the different light-emitting devices in luminous efficiency, and improving the display effect of the display panel.

Figure 4:
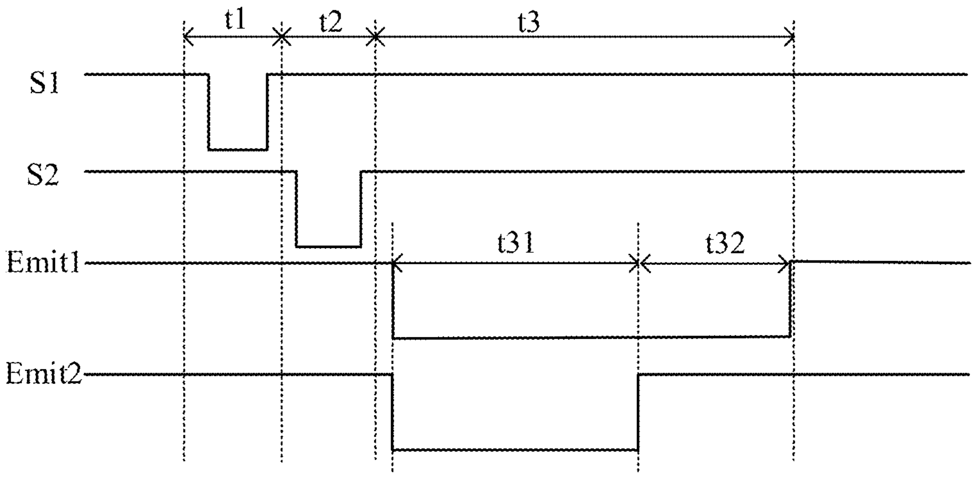
FIG. 4 is a signal timing diagram according to an embodiment of the present disclosure.

In some implementations, as shown in FIG. 3, both the control terminal of the first light-emitting control module 10 and the control terminal of the second light-emitting control module 20 in the second pixel circuit 02 receive the first control signal Emit 1. In the first mode, an effective pulse width of the first control signal Emit 1 is greater than an effective pulse width of the second control signal Emit 2. FIG. 4 is a signal timing diagram according to an embodiment of the present disclosure. The timing diagram provided by FIG. 4 can be applied to the pixel circuit provided by the embodiment of FIG. 3. The working cycle of the pixel circuit in FIG. 3 is understood with reference to FIG. 4. It may be understood that the timing diagram in FIG. 4 can be applied to the first pixel circuit 01 and the second pixel circuit 02 to describe their working cycles, but does not indicate that the first pixel circuit 01 and the second pixel circuit 02 must work in a same period.

With reference to FIG. 3 and FIG. 4, a low level signal is used as an effective pulse signal for example. The working cycle of the first pixel circuit 01 and the working cycle of the second pixel circuit 02 each include a gate reset stage t1, a data writing stage t2, and a light-emitting stage t3. In the working cycle of the first pixel circuit 01, the period when the effective pulse of the first control signal Emit 1 overlaps with the effective pulse of the second control signal Emit 2 is a period t31, and the period when the first control signal Emit 1 provides the effective pulse and the second control signal Emit 2 provides a non-effective pulse is a period t32. In the period t31, the first pixel circuit 01 provides a driving current, such that the first light-emitting device LD1 emits light. In the period t32, since the second light-emitting control module 20 is turned off, the first pixel circuit 01 cannot provide a driving current. In the working cycle of the second pixel circuit 02, the first control signal Emit 1 provides the effective pulse in the period t31 and the period t32, and the first light-emitting control module 10 and the second light-emitting control module 20 are turned on. In the period t31 and the period t32, the second pixel circuit 02 provides a driving current, such that the second light-emitting device LD2 emits light. Thus, a light-emission duration of the second light-emitting device LD2 is longer than a light-emission duration of the first light-emitting device LD1.

In the implementation, in the light-emitting stage t3 of the first pixel circuit 01, the duration when the first pixel circuit provides the driving current is controlled by the first control signal Emit 1 and the second control signal Emit 2. In the light-emitting stage t3 of the second pixel circuit 02, the duration when the second pixel circuit provides the driving current is controlled only by the first control signal Emit 1. In the first mode, the duration when the second pixel circuit 02 provides the driving current is longer than the duration when the first pixel circuit 01 provides the driving current, such that the light-emission duration of the second light-emitting device LD2 is longer than the light-emission duration of the first light-emitting device LD1. This can compensate differences of different light-emitting devices in luminous efficiency, and improve the display effect of the display panel.

In some implementations, in the embodiment of FIG. 3, a wave length of light emitted by the first light-emitting device LD1 is less than a wave length of light emitted by the second light-emitting device LD2. The first light-emitting device LD1 and the second light-emitting device LD2 have different light-emission wavelengths. Due to different light-emitting materials, the first light-emitting device and the second light-emitting device are varied in luminous efficiency. In the embodiment of the present disclosure, the light-emission duration can be designed according to the light-emission wavelength, and the device with a greater light-emission wavelength and lower luminous efficiency has a longer light-emission duration. For example, the first light-emitting device LD1 emits green light, and the second light-emitting device LD2 emits red light. Alternatively, the first light-emitting device LD1 emits blue light, and the second light-emitting device LD2 emits red light.

In an embodiment, in the display panel, the red light-emitting device is driven by the second pixel circuit 02 in FIG. 3, and the green light-emitting device and the blue light-emitting device are driven by the first pixel circuit 01 in FIG. 3. This can achieve a longer light-emission duration of the red light-emitting device, and compensate low luminous efficiency of the red light-emitting device, thereby improving color shift and display effect in applications.

Figure 5:
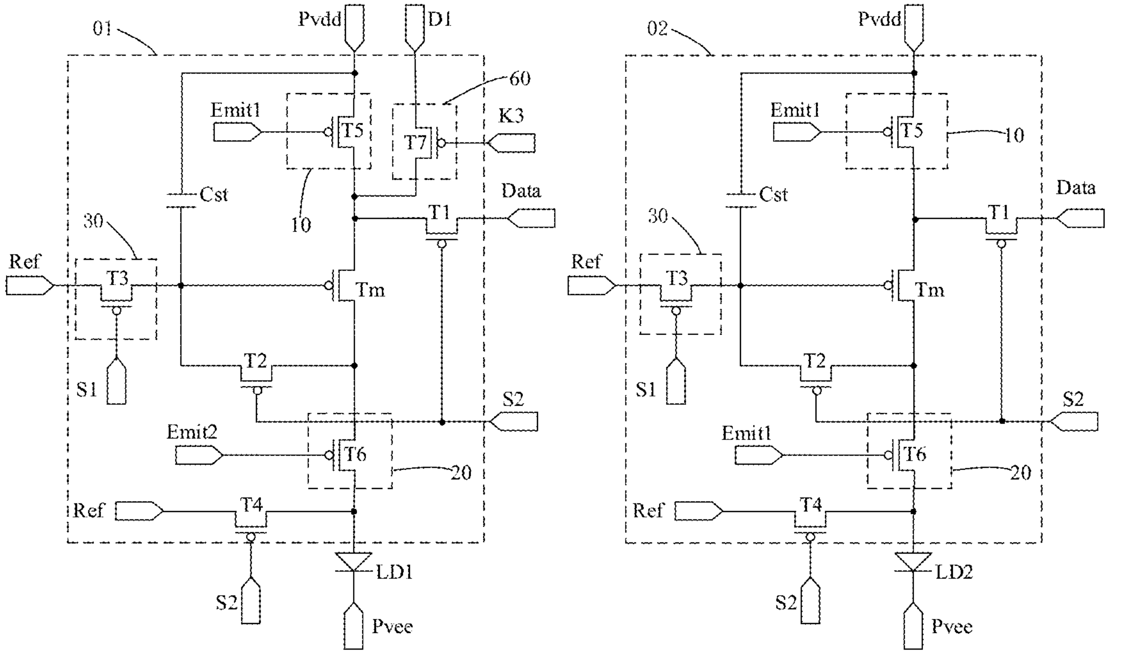
FIG. 5 is a schematic diagram of a pixel circuit in another display panel according to an embodiment of the present disclosure.
Figure 6:
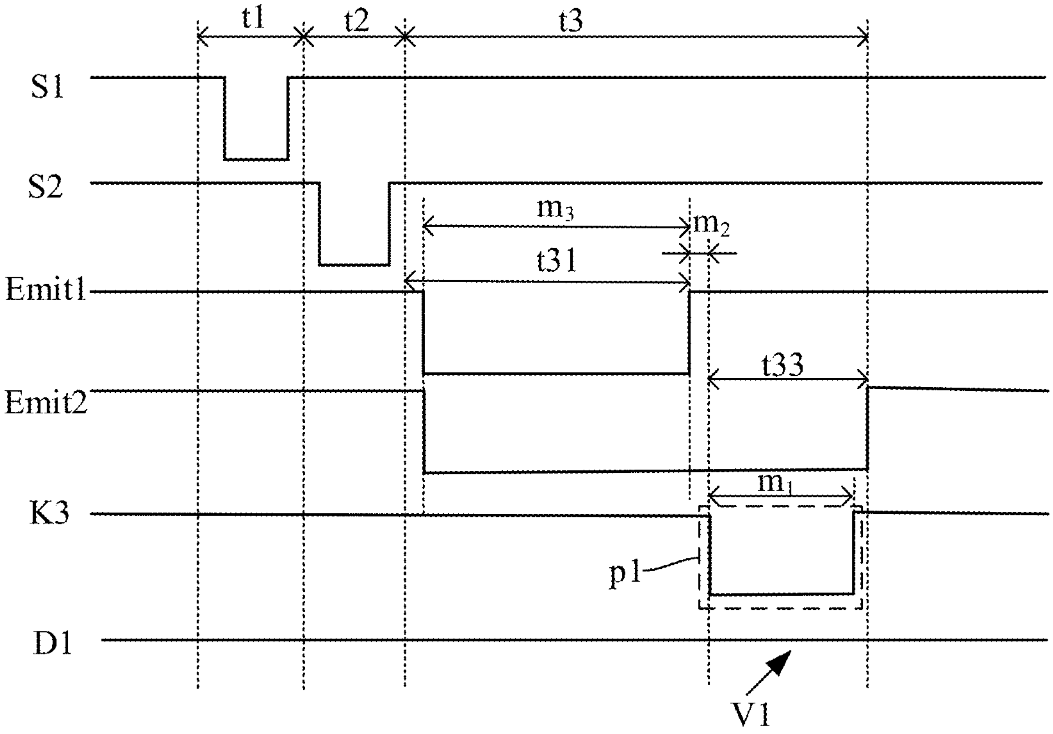
FIG. 6 is another signal timing diagram according to an embodiment of the present disclosure.

In some implementations, FIG. 5 is a schematic diagram of a pixel circuit in another display panel according to an embodiment of the present disclosure, and FIG. 6 is another signal timing diagram according to an embodiment of the present disclosure. The timing diagram provided by FIG. 6 can be applied to the pixel circuit provided by the embodiment of FIG. 5. As shown in FIG. 5, both the control terminal of the first light-emitting control module 10 and the control terminal of the second light-emitting control module 20 in the second pixel circuit 02 receive the first control signal Emit 1. The first pixel circuit 01 further includes a first functional module 60. The first functional module 60 is connected between the first electrode of the drive transistor Tm and a first signal terminal D1. A control terminal of the first functional module 60 receives a third control signal K3.

With reference to FIG. 6, in the first mode, an effective pulse width of the first control signal Emit 1 is less than an effective pulse width of the second control signal Emit 2. The working cycle of the first pixel circuit 01 and the working cycle of the second pixel circuit 02 each include a gate reset stage t1, a data writing stage t2, and a light-emitting stage t3.

In the working cycle of the first pixel circuit 01: In a period t31, the effective pulse of the first control signal Emit 1 overlaps with the effective pulse of the second control signal Emit 2, both the first light-emitting control module 10 and the second light-emitting control module 20 are turned on, and the first pixel circuit 01 provides a driving current for the first light-emitting device LD1. In at least one of periods when the first control signal Emit 1 provides a non-effective pulse and the second control signal Emit 2 provides the effective pulse, namely in a period t33 in FIG. 6, the third control signal K3 provides a first effective pulse p1, such that the first functional module 60 is turned on to write a first signal V1 provided by the first signal terminal D1 into the first electrode of the drive transistor Tm. The first signal V1 is a constant voltage signal. A voltage of the first signal V1 may be the same as a voltage of a signal provided by the first power terminal Pvdd, and may also be not the same as the voltage of the signal provided by the first power terminal. In the period t33, the first functional module 60 is turned on to write the first signal V1 into the first electrode of the drive transistor Tm, the second light-emitting control module 20 is turned on, the drive transistor Tm can generate a driving current, and the first pixel circuit 01 provides the driving current for the first light-emitting device LD1. In the period t31 and the period t33 of the light-emitting stage t3, the first pixel circuit 01 provides the driving current for the first light-emitting device LD1, such that the first light-emitting device LD1 emits light. In the working cycle of the second pixel circuit 02, the first light-emitting control module 10 and the second light-emitting control module 20 are turned on only in the period t31 when the first control signal Emit 1 provides the effective pulse, and the second pixel circuit 02 provides a driving current, such that the second light-emitting device LD2 emits light. Therefore, a light-emission duration of the second light-emitting device LD2 is less than a light-emission duration of the first light-emitting device LD1.

In the implementation, in the first mode, the effective pulse width of the first control signal Emit 1 is less than the effective pulse width of the second control signal Emit 2, and the first functional module 60 is provided in the first pixel circuit 01. In the working cycle of the first pixel circuit 01, in the period when the second control signal Emit 2 provides the effective pulse and the first control signal Emit 1 provides the effective pulse, the first light-emitting control module 10, the drive transistor Tm and the second light-emitting control module 20 are connected serially to form a light-emission channel, and the first pixel circuit 01 provides the driving current for the first light-emitting device LD1. In the period when the second control signal Emit 2 provides the effective pulse and the first control signal Emit 1 provides the non-effective pulse, the first functional module 60, the drive transistor Tm and the second light-emitting control module 20 are connected serially to form another light-emission channel, and the first pixel circuit 01 provides the driving current for the first light-emitting device LD1. In the implementation, in the light-emitting stage t3 of the first pixel circuit 01, the duration when the first pixel circuit provides the driving current is controlled by cooperation among the first control signal Emit 1, the second control signal Emit 2 and the third control signal K3. In the light-emitting stage t3 of the second pixel circuit 02, the duration when the second pixel circuit provides the driving current is controlled only by the first control signal Emit 1. In the implementation, in the first mode, the duration when the first pixel circuit 01 provides the driving current is longer than the duration when the second pixel circuit 02 provides the driving current, such that the light-emission duration of the first light-emitting device LD1 is longer than the light-emission duration of the second light-emitting device LD2. This can compensate differences of different light-emitting devices in luminous efficiency, and improve the display effect of the display panel.

In some implementations, as shown in FIG. 5, the first functional module 60 includes a first transistor T7. A gate of the first transistor T7 receives the third control signal K3. A first electrode of the first transistor T7 is connected to the first signal terminal D1. A second electrode of the first transistor T7 is connected to the first electrode of the drive transistor Tm. Optionally, a channel width and a channel length of the first transistor T7 are respectively the same as a channel width and a channel length of the first light-emitting control transistor T5. That is, a width-to-length ratio of the first transistor T7 is the same as a width-to-length ratio of the first light-emitting control transistor T5. Therefore, the first transistor T7 can keep basically same characteristics as the first light-emitting control transistor T5, so as to conveniently design a high level and a low level of the third control signal K3, and simplify a control manner of the pixel circuit.

In some implementations, as shown in FIG. 5, the first pixel circuit 01 is coupled to the first light-emitting device LD1. The second pixel circuit 02 is coupled to the second light-emitting device LD2. In the first pixel circuit 01, the control terminal of the first light-emitting control module 10 receives the first control signal Emit 1, and the control terminal of the second light-emitting control module 20 receives the second control signal Emit 2. In the second pixel circuit 02, both the control terminal of the first light-emitting control module 10 and the control terminal of the second light-emitting control module 20 receive the first control signal Emit 1. The first pixel circuit 01 further includes a first functional module 60. The first functional module 60 is connected between the first electrode of the drive transistor Tm and a first signal terminal D1. A control terminal of the first functional module 60 receives a third control signal K3. In the first mode, an effective pulse width of the first control signal Emit 1 is less than an effective pulse width of the second control signal Emit 2. In the working cycle of the first pixel circuit 01: In at least one of periods when the first control signal Emit 1 provides a non-effective pulse and the second control signal Emit 2 provides the effective pulse, the third control signal K3 provides a first effective pulse p1, such that the first functional module 60 is turned on to write a first signal provided by the first signal terminal D1 into the first electrode of the drive transistor Tm. In the embodiment of FIG. 5, a wave length of light emitted by the first light-emitting device LD1 is greater than a wave length of light emitted by the second light-emitting device LD2. The first light-emitting device LD1 and the second light-emitting device LD2 have different light-emission wavelengths. Due to different light-emitting materials, the first light-emitting device and the second light-emitting device are varied in luminous efficiency. In the embodiment of the present disclosure, the light-emission duration can be designed according to the light-emission wavelength, and the device with a greater light-emission wavelength and lower luminous efficiency has a longer light-emission duration. For example, the first light-emitting device LD1 emits red light, and the second light-emitting device LD2 emits green or blue light.

In an embodiment, in the display panel, the red light-emitting device is driven by the first pixel circuit 01 in FIG. 5, and the green light-emitting device and the blue light-emitting device are driven by the second pixel circuit 02 in FIG. 5. This can achieve a longer light-emission duration of the red light-emitting device, and compensate low luminous efficiency of the red light-emitting device, thereby improving color shift and display effect in applications.

In some implementations, as shown in FIG. 6, a falling edge of the first effective pulse p1 is after a rising edge of the effective pulse (a low level signal) of the first control signal Emit 1. In this way, a starting period of the first functional module 60 does not overlap with a starting period of the first light-emitting control module 10, thereby preventing a short circuit when the first functional module and the first light-emitting control module are turned on at the same time.

It is to be noted that FIG. 6 illustrates an ideal pulse signal, in which a jump from the high level to the low level and a jump from the low level to the high level seem to be instantaneous. As a matter of fact, regardless of the jump from the high level to the low level or the jump from the low level to the high level, certain time is required. The conversion process from the high level to the low level is called the falling edge, and the conversion process from the low level to the high level is called the rising edge. The rising edge and the falling edge of the actual pulse signal have a certain radian. With the falling edge as an example, when the signal on the falling edge is gradually converted from the high level to the low level, starting time point of the falling edge is time when the high level starts to fall, and ending time point of the falling edge is initial time falling to a target low level.

In addition, in FIG. 6, a rising edge of the second control signal Emit 2 is after a rising edge of the third control signal K3. Optionally, the rising edge of the second control signal Emit 2 overlaps with the rising edge of the third control signal K3. That is, the second control signal Emit 2 and the third control signal K3 show the rising edge in a same period. Alternatively, the rising edge of the second control signal Emit 2 may also be before the rising edge of the third control signal K3.

In addition, in FIG. 6, a falling edge of the second control signal Emit 2 overlaps with a falling edge of the first control signal Emit 1. Alternatively, the falling edge of the second control signal and the falling edge of the first control signal may also be provided in tandem. For example, the falling edge of the second control signal Emit 2 is after the falling edge of the first control signal Emit 1. In the following embodiments, the falling edge of the second control signal Emit 2 overlaps with the falling edge of the first control signal Emit 1 for illustration.

In some implementations, as shown in FIG. 6, in a period t33, the third control signal K3 provides the first effective pulse p1. A duration of the first effective pulse p1 is $m_1$, and an interval between the falling edge of the first effective pulse p1 and the rising edge of the effective pulse of the first control signal Emit 1 is $m_2$, $m_1>m_2$. That is, in the actual pulse signal, ending time point of the rising edge of the effective pulse of the first control signal Emit 1 and starting time point of the falling edge of the first effective pulse p1 are spaced by the interval $m_2$. In the working cycle of the first pixel circuit 01, in a period between the falling edge of the first effective pulse p1 and the rising edge of the effective pulse of the first control signal Emit 1, only the second control signal Emit 2 provides the effective pulse, and the first pixel circuit 01 cannot provide a driving current. The duration $m_1$ of the first effective pulse p1 affects the light-emission duration of the first light-emitting device LD1. In the light-emitting stage t3, the longer the duration $m_1$, the greater the increment of the light-emission duration of the first light-emitting device LD1 over the light-emission duration of the second light-emitting device LD2. In the implementation, $m_1>m_2$. In the working cycle of the first pixel circuit 01, the smaller the $m_2$, the more the time for adjusting the light-emission duration of the first light-emitting device LD1, and the larger the degree of freedom for adjusting the light-emission duration.

In some implementations, as shown in FIG. 6, a duration of the first effective pulse p1 is $m_1$, and a duration of the effective pulse of the first control signal Emit 1 is $m_3$, $m_3>m_1$. The duration of the effective pulse of the first control signal Emit 1 may also be understood as the effective pulse width of the first control signal Emit 1. In the implementation, time when the second pixel circuit 02 provides the driving current is controlled by the first control signal Emit 1. The effective pulse width of the first control signal Emit 1 affects a light-emission duration of the second light-emitting device LD2. For the first pixel circuit 01, in the period t31, the first control signal Emit 1 provides the effective pulse and the second control signal Emit 2 provides the effective pulse. The period (period t31) when the control signal Emit 1 provides the effective pulse can be understood as a first light-emitting stage of the first pixel circuit 01. The period (period t33) when the third control signal K3 provides the effective pulse can be understood as a second light-emitting stage of the first pixel circuit 01. In the implementation, $m_3>m_1$. In the first mode, a light-emission duration of the first light-emitting device LD1 can be increased with cooperation between the first effective pulse p1 and the second control signal Emit 2, and the second light-emitting device LD2 driven by the second pixel circuit 02 can also have an enough light-emission duration.

In some implementations, the display panel includes different work modes. In response to the different work modes, different pulse widths of the control signal are matched, such that the light-emitting device has different emission durations in the different modes.

Figure 7:
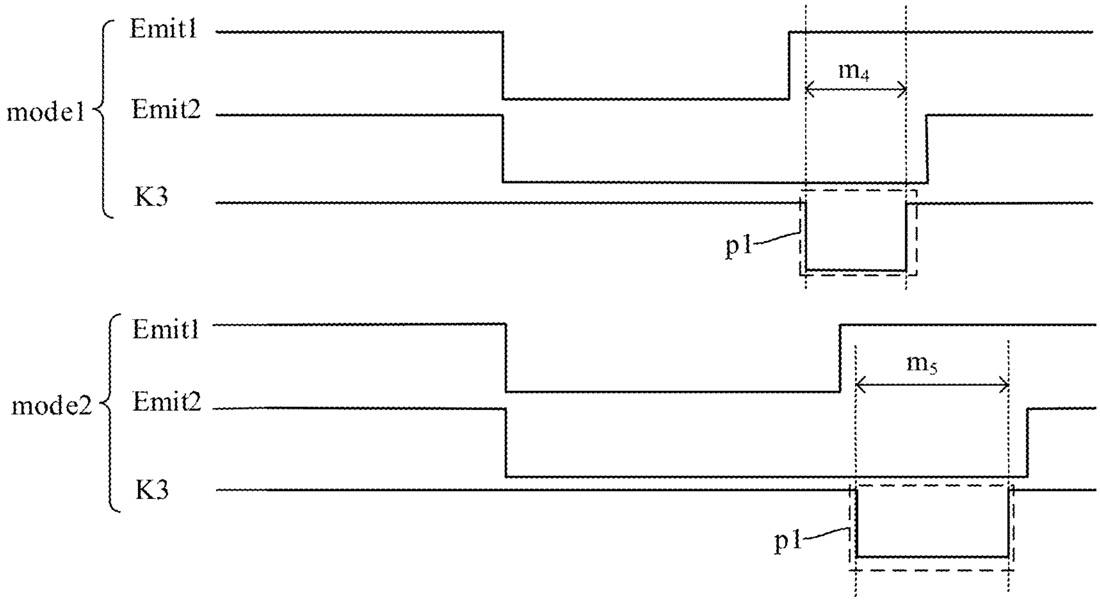
FIG. 7 is another signal timing diagram according to an embodiment of the present disclosure.

In an embodiment, FIG. 7 is another signal timing diagram according to an embodiment of the present disclosure. FIG. 7 only provides signal timing for the first control signal Emit 1, the second control signal Emit 2 and the third control signal K3. FIG. 7 can be applied to the pixel circuit provided by the embodiment of FIG. 5. With reference to FIG. 5 and FIG. 7, the display panel includes the first mode mode1 and a second mode mode2. In the first mode mode1, the first control signal Emit 1 and the second control signal Emit 2 are different control signals. In the second mode mode2, the first control signal Emit 1 and the second control signal Emit 2 are different control signals.

As can be seen from FIG. 7, the effective pulse width of the second control signal Emit 2 in the first mode mode1 is less than an effective pulse width of the second control signal Emit 2 in the second mode mode2, and a pulse width of the first effective pulse p1 of the third control signal K3 in the first mode mode1 is less than a pulse width of the first effective pulse p1 in the second mode mode2. An overlap duration for the effective pulse of the second control signal Emit 2 and the first effective pulse p1 in the first mode mode1 is $m_4$, and an overlap duration for the effective pulse of the second control signal Emit 2 and the first effective pulse p1 in the second mode mode2 is $m_5$, $m_4<m_5$. The term "overlap duration" in the embodiment refers to that two pulse signals have an effective pulse in a period, and the length of the period is the overlap duration for the two pulse signals. Contents on the "overlap duration" in the following embodiments may also refer to the descriptions herein for understanding.

It is to be noted that in FIG. 7, a rising edge of the second control signal Emit 2 is before a rising edge of the third control signal K3. Optionally, the rising edge of the second control signal Emit 2 is after the rising edge of the third control signal K3. Alternatively, the rising edge of the second control signal Emit 2 overlaps with the rising edge of the third control signal K. The following related drawing only takes one case for illustration. The "overlap duration" is defined by the headmost rising edge.

In the working cycle of the first pixel circuit 01, in the period when the effective pulse of the second control signal Emit 2 overlaps with the first effective pulse p1, the first pixel circuit 01 provides a driving current for the first light-emitting device LD1. In the implementation, in the two modes, the first effective pulse p1 has different pulse widths, the second control signal Emit 2 has different effective pulse widths, and $m_4<m_5$. In the same mode, the overlap duration for the effective pulse of the second control signal Emit 2 and the first effective pulse p1 affects the increment of the light-emission duration of the first light-emitting device LD1 over the light-emission duration of the second light-emitting device LD2. That is, the longer the overlap duration, the longer the light-emission duration of the first light-emitting device LD1, and the greater the increment of the light-emission duration of the first light-emitting device LD1 over the light-emission duration of the second light-emitting device LD2. In the implementation, the increment of the light-emission duration of the first light-emitting device LD1 over the light-emission duration of the second light-emitting device LD2 in the second mode mode2 is greater than the increment of the light-emission duration of the first light-emitting device LD1 over the light-emission duration of the second light-emitting device LD2 in the first mode mode1. That is, the first light-emitting device LD1 has the longer light-emission duration in the second mode mode2, so as to compensate luminance of the first light-emitting device more, and meet requirements on the luminance of the first light-emitting device LD1 in different work modes.

In addition, as shown in FIG. 7, the effective pulse width of the first control signal Emit 1 in the first mode mode1 is less than the effective pulse width of the first control signal Emit 1 in the second mode mode2. In this way, the light-emission duration of the second light-emitting device LD2 in the second mode mode2 is longer than the light-emission duration of the second light-emitting device in the first mode mode1, and the light-emission duration of the first light-emitting device LD1 in the second mode mode2 is longer than the light-emission duration of the first light-emitting device in the first mode mode1. With reference to $m_4<m_5$, the first light-emitting device LD1 and the second light-emitting device LD2 have different emission durations in different modes, and the increment of the light-emission duration of the first light-emitting device LD1 in the second mode mode2 is greater. Therefore, the light-emitting devices of different colors can be compensated in luminance to different extents in different modes, thereby improving the display effect.

In some implementations, a work temperature in the first mode mode1 is less than a work temperature in the second mode mode2. Optionally, the first mode mode1 is a normal-temperature work mode, and the second mode mode2 is a high-temperature work mode. The luminous efficiency of the light-emitting device is affected by a temperature greatly. The temperature poses different influences on luminous efficiency of LEDs of different colors. In the high-temperature work mode, color shift and luminance drop will arise. With the design in the embodiment of the present disclosure, the light-emission duration of the first light-emitting device LD1 and the light-emission duration of the second light-emitting device LD2 can be increased in the second mode2, thereby compensating the luminance drop arising from reduced luminous efficiency caused by the high temperature. Moreover, the light-emission duration of the first light-emitting device LD1 can be longer than the light-emission duration of the second light-emitting device LD2 in the second mode mode2. For example, when the luminous efficiency of the first light-emitting device LD1 is more affected by the temperature than the luminous efficiency of the second light-emitting device LD2, the luminance of the first light-emitting device LD1 can be compensated more in the second mode mode2. Therefore, differential compensations can be made for reduced luminous efficiency of different light-emitting devices due to the high temperature, to improve the color shift in the display.

In other implementations, luminance of the display panel in the first mode mode1 is less than luminance of the display panel in the second mode mode2. Optionally, the first mode mode1 is a low-luminance work mode, and the second mode mode2 is a high-luminance work mode. With the design in the embodiment of the present disclosure, the light-emission duration of the first light-emitting device LD1 and the light-emission duration of the second light-emitting device LD2 can be increased in the second mode2, and the light-emission duration of the first light-emitting device LD1 is longer than the light-emission duration of the second light-emitting device LD2. This not only can compensate differences of the different light-emitting devices in luminous efficiency, but also can meet requirements on luminance of the device in the high-luminance work mode.

Figure 8:
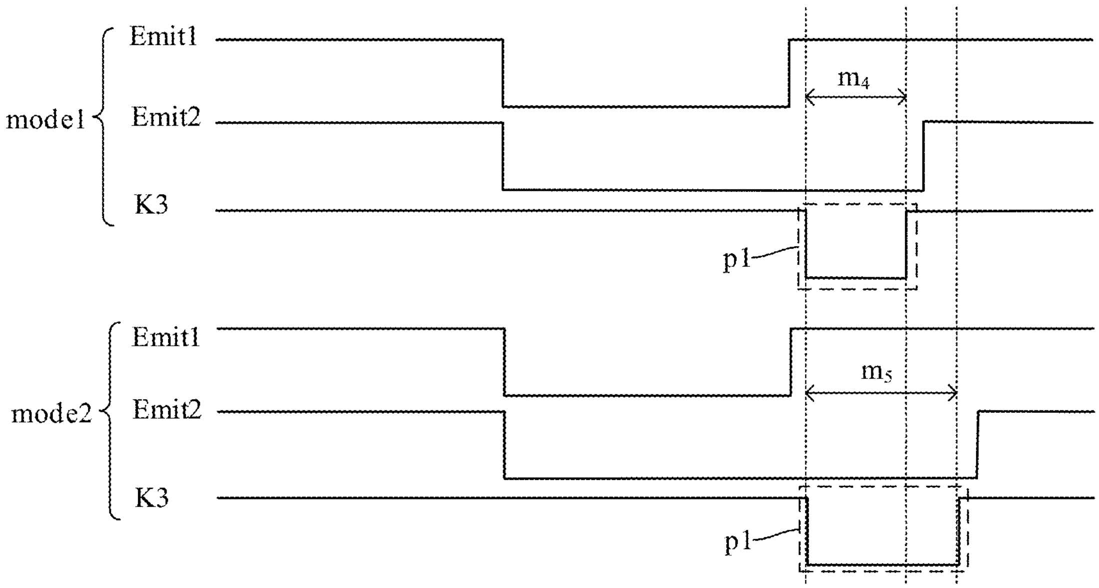
FIG. 8 is another signal timing diagram according to an embodiment of the present disclosure.

In other implementations, FIG. 8 is another signal timing diagram according to an embodiment of the present disclosure. FIG. 8 only provides signal timing for the first control signal Emit 1, the second control signal Emit 2 and the third control signal K3. FIG. 8 can be applied to the pixel circuit provided by the embodiment of FIG. 5. With reference to FIG. 5 and FIG. 8, the display panel includes the first mode mode1 and a second mode mode2. In the first mode mode1, the first control signal Emit 1 and the second control signal Emit 2 are different control signals. In the second mode mode2, the first control signal Emit 1 and the second control signal Emit 2 are different control signals. The effective pulse width of the first control signal Emit 1 in the first mode mode1 is the same as an effective pulse width of the first control signal in the second mode mode2, the effective pulse width of the second control signal Emit 2 in the first mode mode1 is less than an effective pulse width of the second control signal in the second mode mode2, and a pulse width of the first effective pulse p1 of the third control signal K3 in the first mode mode1 is less than a pulse width of the first effective pulse of the third control signal in the second mode mode2. An overlap duration for the effective pulse of the second control signal Emit 2 and the first effective pulse p1 in the first mode mode1 is $m_4$, and an overlap duration for the effective pulse of the second control signal Emit 2 and the first effective pulse p1 in the second mode mode2 is $m_5$, $m_4<m_5$. In the implementation, in one work mode, a light-emission duration of the first light-emitting device LD1 is longer than a light-emission duration of the second light-emitting device LD2, a light-emission duration of the second light-emitting device LD2 in the first mode mode1 is the same as a light-emission duration of the second light-emitting device in the second mode mode2, a light-emission duration of the first light-emitting device LD1 in the second mode mode2 is longer than a light-emission duration of the first light-emitting device in the first mode mode1, and the increment of the light-emission duration of the first light-emitting device LD1 over the light-emission duration of the second light-emitting device LD2 in the second mode mode2 is greater than the increment of the light-emission duration of the first light-emitting device LD1 over the light-emission duration of the second light-emitting device LD2 in the first mode mode1.

Figure 9:
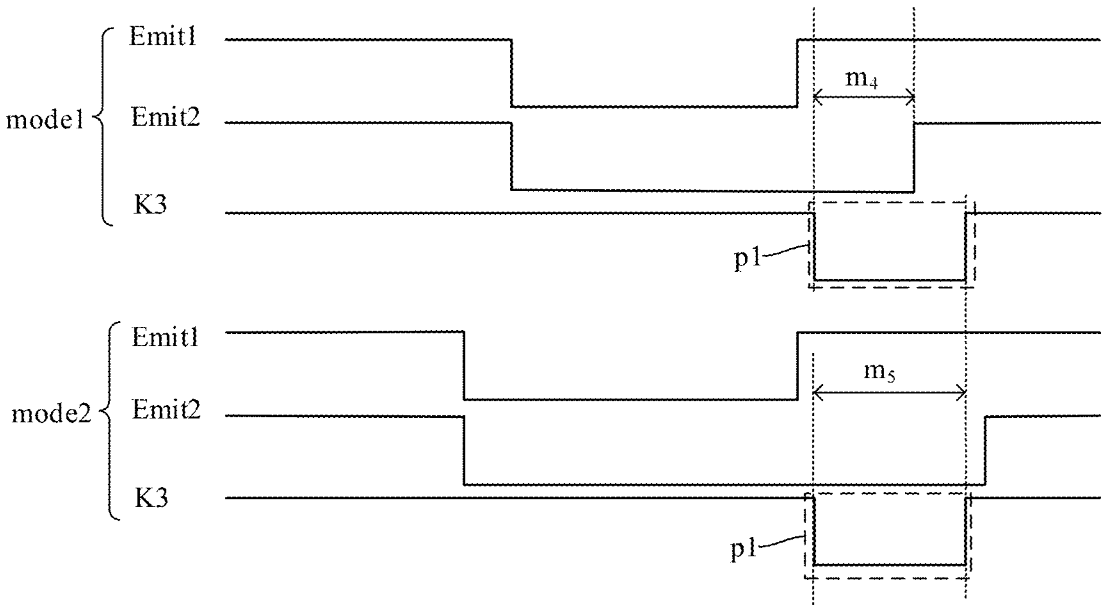
FIG. 9 is another signal timing diagram according to an embodiment of the present disclosure.

In another embodiment, FIG. 9 is another signal timing diagram according to an embodiment of the present disclosure. FIG. 9 only provides signal timing for the first control signal Emit 1, the second control signal Emit 2 and the third control signal K3. FIG. 9 can be applied to the pixel circuit provided by the embodiment of FIG. 5. With reference to FIG. 5 and FIG. 9, the display panel further includes the first mode mode1 and a second mode mode2. The effective pulse width of the second control signal Emit 2 in the first mode mode1 is less than an effective pulse width of the second control signal Emit 2 in the second mode mode2. A pulse width of the first effective pulse p1 in the first mode mode1 is the same as a pulse width of the first effective pulse p1 in the second mode mode2. An overlap duration for the effective pulse of the second control signal Emit 2 and the first effective pulse p1 in the first mode mode1 is $m_4$, and an overlap duration for the effective pulse of the second control signal Emit 2 and the first effective pulse p1 in the second mode mode2 is $m_5$, $m_4<m_5$. The term "overlap duration" herein refers to that two pulse signals have an effective pulse in a period, and the length of the period is the overlap duration for the two pulse signals. Contents on the "overlap duration" may refer to the descriptions herein for understanding. In the implementation, the first effective pulse p1 has the same pulse width in the two modes, and the second control signal Emit 2 has different effective pulse widths in the two modes. With reference to $m_4<m_5$, a light-emission duration of the first light-emitting device LD1 in the second mode mode2 is longer than a light-emission duration of the first light-emitting device in the first mode mode1. The first light-emitting device LD1 has the longer light-emission duration in the second mode mode2, so as to compensate the luminance of the first light-emitting device more, and meet requirements on the luminance of the first light-emitting device LD1 in different work modes.

In addition, FIG. 9 further illustrates that the effective pulse width of the first control signal Emit 1 in the first mode mode1 is less than the effective pulse width of the first control signal Emit 1 in the second mode mode2. In this way, the first light-emitting device LD1 and the second light-emitting device LD2 can have different light-emission wavelengths in different modes. With reference to $m_4<m_5$, the increment of the light-emission duration of the first light-emitting device LD1 in the second mode mode2 is greater. Therefore, the light-emitting devices of different colors can be compensated in luminance to different extents in different modes, thereby improving the display effect.

The signal timing diagram provided by the embodiment of FIG. 9 can be applied to the solution in which the work temperature in the first mode mode1 is less than the work temperature in the second mode mode2, and may also be applied to the solution in which the luminance of the display panel in the first mode mode1 is less than the luminance of the display panel in the second mode mode2.

Figure 10:
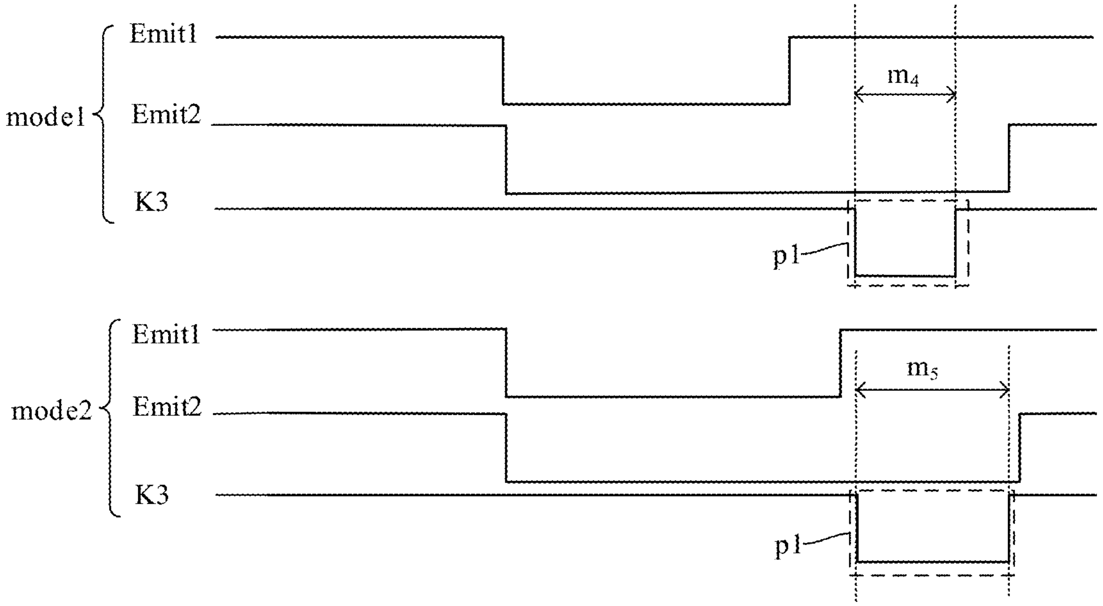
FIG. 10 is another signal timing diagram according to an embodiment of the present disclosure.

In other embodiments, FIG. 10 is another signal timing diagram according to an embodiment of the present disclosure. FIG. 10 only provides signal timing for the first control signal Emit 1, the second control signal Emit 2 and the third control signal K3. FIG. 10 can be applied to the pixel circuit provided by the embodiment of FIG. 5. With reference to FIG. 5 and FIG. 10, the display panel further includes the first mode mode1 and a second mode mode2. The effective pulse width of the second control signal Emit 2 in the first mode mode1 is the same as an effective pulse width of the second control signal in the second mode mode2. A pulse width of the first effective pulse p1 in the first mode mode1 is less than a pulse width of the first effective pulse p1 in the second mode mode2. An overlap duration for the effective pulse of the second control signal Emit 2 and the first effective pulse p1 in the first mode mode1 is $m_4$, and an overlap duration for the effective pulse of the second control signal Emit 2 and the first effective pulse p1 in the second mode mode2 is $m_5$, $m_4<m_5$. In the implementation, the first effective pulse p1 has different pulse widths in the two modes, and the second control signal Emit 2 has the same effective pulse width in the two modes. With reference to $m_4<m_5$, a light-emission duration of the first light-emitting device LD1 in the second mode mode2 is longer than a light-emission duration of the first light-emitting device in the first mode mode1. The first light-emitting device LD1 has the longer light-emission duration in the second mode mode2, so as to compensate the luminance of the first light-emitting device more, and meet requirements on the luminance of the first light-emitting device LD1 in different work modes.

In addition, FIG. 10 further illustrates that the effective pulse width of the first control signal Emit 1 in the first mode mode1 is less than the effective pulse width of the first control signal Emit 1 in the second mode mode2. In this way, the first light-emitting device LD1 and the second light-emitting device LD2 can have different light-emission wavelengths in different modes. With reference to $m_4<m_5$, the increment of the light-emission duration of the first light-emitting device LD1 in the second mode mode2 is greater. Therefore, the light-emitting devices of different colors can be compensated in luminance to different extents in different modes, thereby improving the display effect.

The signal timing diagram provided by the embodiment of FIG. 10 can be applied to the solution in which the work temperature in the first mode mode1 is less than the work temperature in the second mode mode2, and may also be applied to the solution in which the luminance of the display panel in the first mode mode1 is less than the luminance of the display panel in the second mode mode2.

Figure 11:
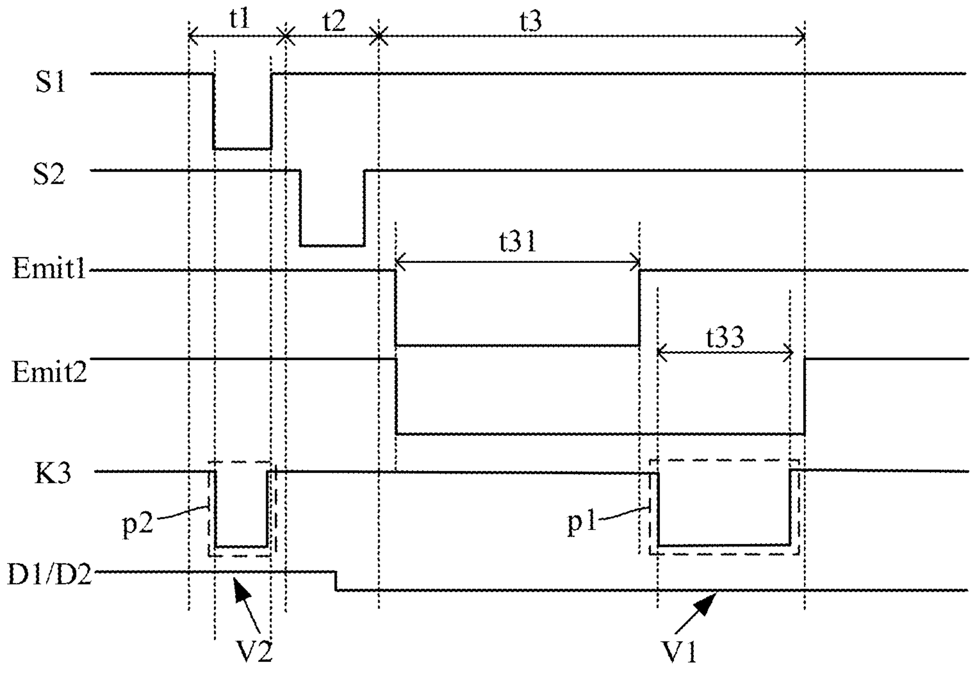
FIG. 11 is another signal timing diagram according to an embodiment of the present disclosure.

In some implementations, FIG. 11 is another signal timing diagram according to an embodiment of the present disclosure. The timing diagram provided by FIG. 11 can be applied to the pixel circuit provided by the embodiment of FIG. 5. With reference to FIG. 11 and FIG. 5, the working cycle of the first pixel circuit 01 includes a data writing stage t2. The data writing stage t2 is before the second control signal Emit 2 provides the effective pulse. Before the data writing stage t2, the third control signal K3 provides a second effective pulse p2, such that the first functional module 60 is turned on to write a first pre-charge signal V2 provided by the first signal terminal D1 into the first electrode of the drive transistor Tm. In the implementation, the third control signal K3 provides the second effective pulse p2 before the data writing stage t2. The third control signal K3 provides the first effective pulse p1 in the light-emitting stage t3. The first functional module 60 is turned on in two periods. The first functional module 60 can cooperate with the second light-emitting control module 20 in the light-emitting stage to form another light-emission channel, thereby prolonging a light-emission duration of the first light-emitting device LD1. The first functional module 60 can further pre-charge the first electrode of the drive transistor Tm before the data writing stage t2. This can ensure that data writing in the data writing stage t2 is more sufficient to improve uniformity of the display.

In some implementations, as shown in FIG. 11, at least in a period when the first functional module 60 is turned on through the second effective pulse p2, the first signal terminal D1 provides the first pre-charge signal V2. The first pre-charge signal V2 is a constant voltage signal. In this way, the first pixel circuits 01 at different positions in the display panel can be pre-charged with a same voltage signal, wiring in the display panel can be simplified, a number of signal terminals and a space in the display panel can be saved, and a manufacturing cost of a driver chip can further be lowered correspondingly.

In some implementations, a voltage of the first pre-charge signal V2 is greater than a voltage of the first signal V1. In the implementation, the first signal terminal D1 at least provides a signal in each of two different periods. The first pre-charge signal V2 provided by the first signal terminal D1 is functionally different from the first signal V1. The first pre-charge signal V2 is used to pre-charge the first electrode of the drive transistor Tm before the data writing stage t2 to ensure more sufficient data writing in the data writing stage t2. The first signal V1 is used to form a bias state of the drive transistor Tm to generate the driving current in the light-emitting stage t3. The driving current is provided for the first light-emitting device LD1 to prolong the light-emission duration. By setting the voltage of the first pre-charge signal V2 to be larger, the first electrode of the drive transistor Tm can be pre-charged well in a relatively short time.

In some implementations, the first power terminal Pvdd provides a first power signal Pvdd. The first power terminal and the first power signal use a same reference sign. A voltage of the first pre-charge signal V2 is greater than a voltage of the first power signal Pvdd. With reference to the working cycle of the first pixel circuit 01, in a period when the first control signal Emit 1 provides the effective level, the first power terminal Pvdd is connected to the first electrode of the drive transistor Tm to write the first power signal Pvdd into the first electrode of the drive transistor Tm. In a period t31, both the first control signal Emit 1 and the second control signal Emit 2 provide the effective level, and a light-emission channel formed by serially connecting the first light-emitting control module 10, the drive transistor Tm and the second light-emitting control module 20 works to provide a driving current for the first light-emitting device LD1. That is, the first power signal Pvdd is used to form the bias state of the drive transistor Tm to generate the driving current in the light-emitting stage t3. The first pre-charge signal V2 is used to pre-charge the first electrode of the drive transistor Tm before the data writing stage t2. Both the first pre-charge signal V2 and the first power signal Pvdd are written into the first electrode of the drive transistor Tm, but they are written in different periods and are functionally different. By setting the voltage of the first pre-charge signal V2 to be larger, the first electrode of the drive transistor Tm can be pre-charged well in a relatively short time.

In some implementations, the voltage of the first signal V1 is the same as the voltage of the first power signal Pvdd.

In other implementations, the voltage of the first signal V1 is not the same as the voltage of the first power signal Pvdd.

In some implementations, as shown in FIG. 5, in the pixel circuit, the gate reset module 30 is connected between the reset signal terminal Ref and the gate of the drive transistor Tm, and a control terminal of the gate reset module 30 receives the first scan signal S1. With reference to FIG. 11, in the working cycle of the first pixel circuit 01: In the gate reset stage t1, the first scan signal S1 provides an effective pulse, such that the gate reset module 30 is turned on to write a reset signal into the gate of the drive transistor Tm, so as to reset the gate of the drive transistor Tm. A period when the third control signal K3 provides the second effective pulse p2 at least partially overlaps with a period when the first scan signal S1 provides the effective pulse. It may be understood that a duration of the working cycle of the pixel circuit is associated with a refresh rate of the display panel. In response to a determined number of pixel rows in the display panel, the higher the refresh rate, the shorter the driving time allocated to each pixel row, and the shorter the duration of the working cycle of the pixel circuit. In the embodiment of the present disclosure, through the second effective pulse p2 of the third control signal K3, the first functional module 60 can be turned on to pre-charge the first electrode of the drive transistor Tm. The second effective pulse p2 is to be provided before the data writing stage t2. The gate reset stage t1 is an original work stage in the working cycle of the first pixel circuit 01. The period of the second effective pulse p2 at least partially overlaps with the period when the first scan signal S1 provides the effective pulse. This can reduce influences of the second effective pulse p2 on the duration of the working cycle of the first pixel circuit 01, and ensure that the duration of the working cycle can match with the displayed refresh rate.

In some implementations, as shown in FIG. 11, in the working cycle of the first pixel circuit 01: Starting time when the third control signal K3 provides the second effective pulse p2 coincides with starting time point when the first scan signal S1 provides the effective pulse, and ending time point when the third control signal K3 provides the second effective pulse p2 coincides with ending time point when the first scan signal S1 provides the effective pulse. That is, the third control signal K3 provides the second effective pulse p2 in the gate reset stage t3. In this way, not only is the total duration of the working cycle of the first pixel circuit 01 not affected, but also the time for pre-charging the first electrode of the drive transistor Tm can be enough long.

In some implementations, as shown in FIG. 11, a pulse width of the second effective pulse p2 is less than a pulse width of the first effective pulse p1. The pulse width of the second effective pulse p2 affects the time for pre-charging the first electrode of the drive transistor Tm. The pulse width of the first effective pulse p1 affects the light-emission duration of the first light-emitting device LD1. By setting the pulse width of the first effective pulse p1 to be larger, the light-emission duration has a larger adjustable amplitude in the working cycle of the first pixel circuit 01.

Figure 12:
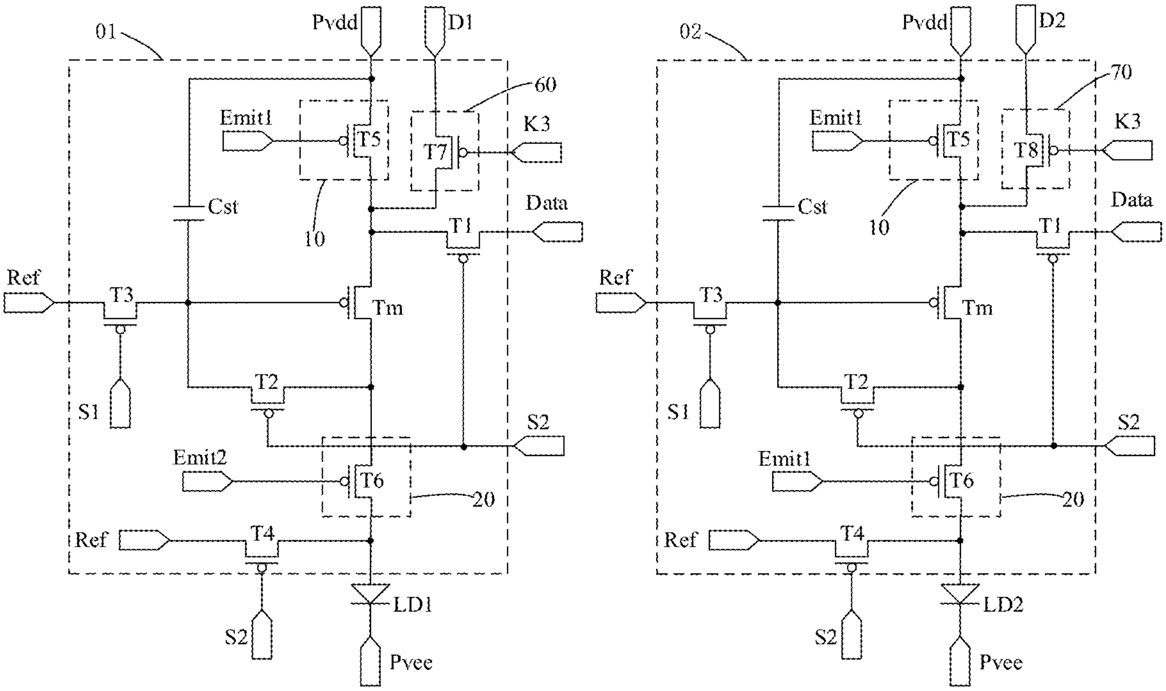
FIG. 12 is a schematic diagram of another pixel circuit according to an embodiment of the present disclosure.
Figure 13:
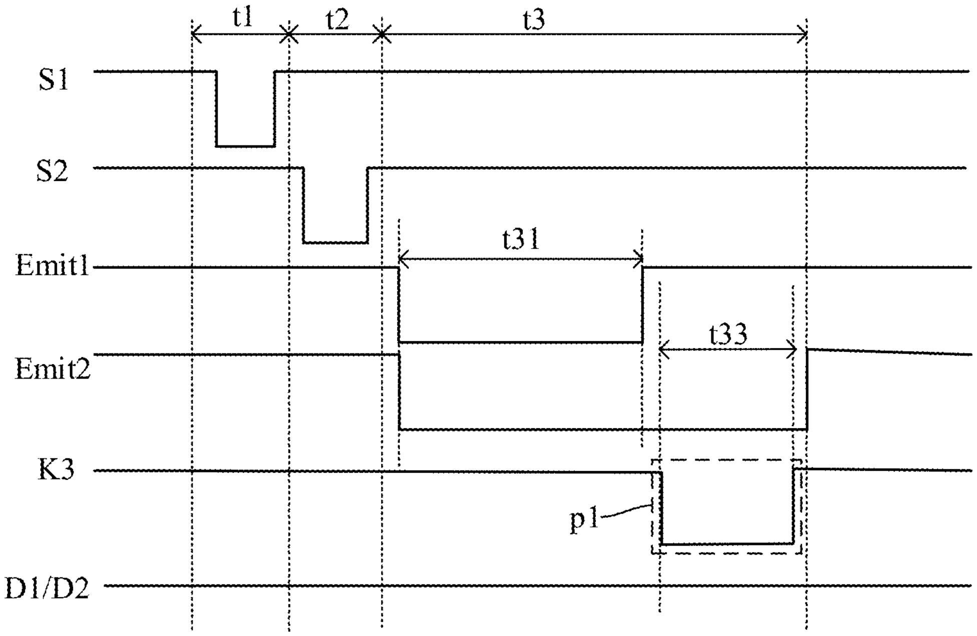
FIG. 13 is another signal timing diagram according to an embodiment of the present disclosure.

In some implementations, FIG. 12 is a schematic diagram of another pixel circuit according to an embodiment of the present disclosure, and FIG. 13 is another signal timing diagram according to an embodiment of the present disclosure. The timing diagram provided by FIG. 13 can be applied to the pixel circuit provided by the embodiment of FIG. 12. As shown in FIG. 12, the first pixel circuit 01 further includes a first functional module 60. The second functional module 60 is connected between the first electrode of the drive transistor Tm and a first signal terminal D1. The second pixel circuit 02 includes a second functional module 70. The second functional module 70 is connected between the first electrode of the drive transistor Tm and a second signal terminal D2. With reference to FIG. 13, in a working cycle of the second pixel circuit 02: In at least one of periods when the first control signal Emit 1 is a non-effective pulse, such as a period t33, the second functional module 70 is turned on to write a second signal from the second signal terminal D2 into the first electrode of the drive transistor Tm.

The working cycle of the second pixel circuit 02 includes a gate reset stage t1, a data writing stage t2, and a light-emitting stage t3. In the light-emitting stage t3, in a period when the first control signal Emit 1 provides the effective pulse, namely a period t31, the first light-emitting control module 10 and the second light-emitting control module 20 are turned on, and the first light-emitting control module 10, the drive transistor Tm and the second light-emitting control module 20 form a light-emission channel provide a driving current for the second light-emitting device LD2. In the working cycle of the first pixel circuit 01, in the period t31 of the light-emitting stage t3, the first light-emitting control module 10, the drive transistor Tm and the second light-emitting control module 20 form a light-emission channel. In a period t32, the first functional module 60, the drive transistor Tm and the second light-emitting control module 20 form another light-emission channel. A work duration of the drive transistor Tm in the first pixel circuit 01 is longer than a work duration of the drive transistor Tm in the second pixel circuit 02. This may cause differences of the two drive transistors Tm in threshold shift. In the embodiment of the present disclosure, the second functional module 70 is provided in the second pixel circuit 02. The second function module 70 can be used to write the second signal to the first electrode of the drive transistor Tm in non-light-emitting time (at least one of the periods when the first control signal Emit 1 provides the non-effective pulse), so as to adjust a bias state of the drive transistor Tm. In the implementation, differences between the drive transistor Tm in the first pixel circuit 01 and the drive transistor in the second pixel circuit 02 in bias state can be reduced, and characteristic differences between the drive transistors Tm in the two pixel circuits can be reduced. This improves the uniformity in the display.

In some implementations, the second signal terminal D2 and the first signal terminal D1 provide a same signal. When the second signal terminal D2 and the first signal terminal D1 provide a constant voltage signal in the working cycle of the pixel circuit, crisscrossed and electrically connected signal lines may be provided in the display panel to form latticed traces. The latticed traces include a first signal line and a second signal line. The first functional module 60 is coupled to the first signal line. The first signal line serves as the first signal terminal D1. The second functional module 70 is coupled to the second signal line. The second signal line serves as the second signal terminal D2. This can reduce voltage drop on the signal line, and makes a signal on the panel more uniform. When the second signal terminal D2 and the first signal terminal D1 provide different signals in a time-sharing manner in the working cycle of the pixel circuit, the first pixel circuit 01 and the second pixel circuit 02 located on a same row of the pixel circuit are coupled to a same signal line. The signal line serves as the second signal terminal D2 and the first signal terminal D1. The second signal terminal D2 and the first signal terminal D1 provide a same signal. This can simplify the wiring of the display panel, and save the space.

When the second signal terminal D2 and the first signal terminal D1 provide the same signal, the period t33 of the first pixel circuit 01 corresponds to the period t33 of the second pixel circuit 02, and the first signal provided by the first signal terminal D1 and the second signal from the second signal terminal D2 have a same voltage.

In some implementations, in the period t33 of the first pixel circuit 01, the first functional module 60 is turned on. In the period t33 of the second pixel circuit 02, the second functional module 70 is turned on. The period t33 of the first pixel circuit 01 corresponds to the period t33 of the second pixel circuit 02. As shown in FIG. 12, a control terminal of the second functional module 70 and the control terminal of the first functional module 60 receive a same signal. That is, the control terminal of the second functional module 70 receives the third control signal K3. This can simplify the wiring of the display panel, and save the space.

In an embodiment, the display panel includes a first driver circuit, a second driver circuit, and a third driver circuit. The three types of driver circuits each include a plurality of cascaded shift registers. A first control line, a second control line, and a third control line are further arranged in the display panel. The first control line is coupled to the first driver circuit, and the first control line provides the first control signal Emit 1. The second control line is coupled to the second driver circuit, and the second control line provides the second control signal Emit 2. The third control line is coupled to the third driver circuit, and the third control line provides the third control signal K3.

In some implementations, as shown in FIG. 12, the second functional module 70 includes a second transistor T8. A control terminal of the second transistor T8 receives the third control signal K3. A first electrode of the second transistor T8 is connected to the second signal terminal D2. A second electrode of the second transistor T8 is connected to the first electrode of the drive transistor Tm.

Optionally, the second transistor T8 and the first transistor T7 have a same channel width and a same channel length.

In other implementations, the pixel circuit provided by the embodiment of FIG. 12 may further be driven by the signal timing in FIG. 11. With reference to FIG. 11, the working cycle of the second pixel circuit 02 includes a gate reset stage t1, a data writing stage t2, and a light-emitting stage t3. In the working cycle of the second pixel circuit 02: The first control signal Emit 1 provides the effective pulse in the light-emitting stage t3. The data writing stage t2 is before the first control signal Emit 1 provides the effective pulse. Before the data writing stage t2, the third control signal K3 provides a second effective pulse p2, such that the second functional module 70 is turned on to write a second pre-charge signal from the second signal terminal D2 into the first electrode of the drive transistor Tm. When the second signal terminal D2 and the first signal terminal D1 provide the same signal, a voltage of the second pre-charge signal is the same as the voltage of the first pre-charge signal V2. In the implementation, the second functional module 70 can write the second signal into the first electrode of the drive transistor Tm at non-light-emitting time, so as to adjust the bias state of the drive transistor Tm, reduce characteristic differences between the drive transistors Tm in the two pixel circuits, and improve the uniformity in the display. The second functional module 70 can further pre-charge the first electrode of the drive transistor Tm before the data writing stage t2. This can ensure that data writing in the data writing stage t2 is more sufficient to improve uniformity of the display.

Figure 14:
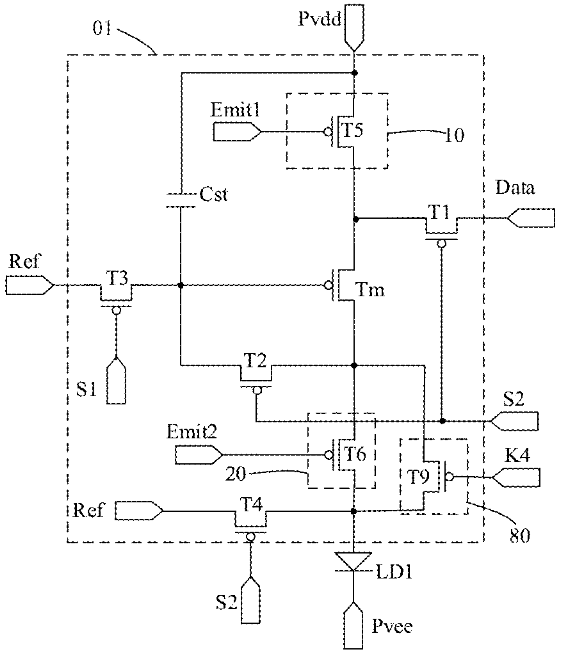
FIG. 14 is a schematic diagram of another pixel circuit according to an embodiment of the present disclosure.
Figure 15:
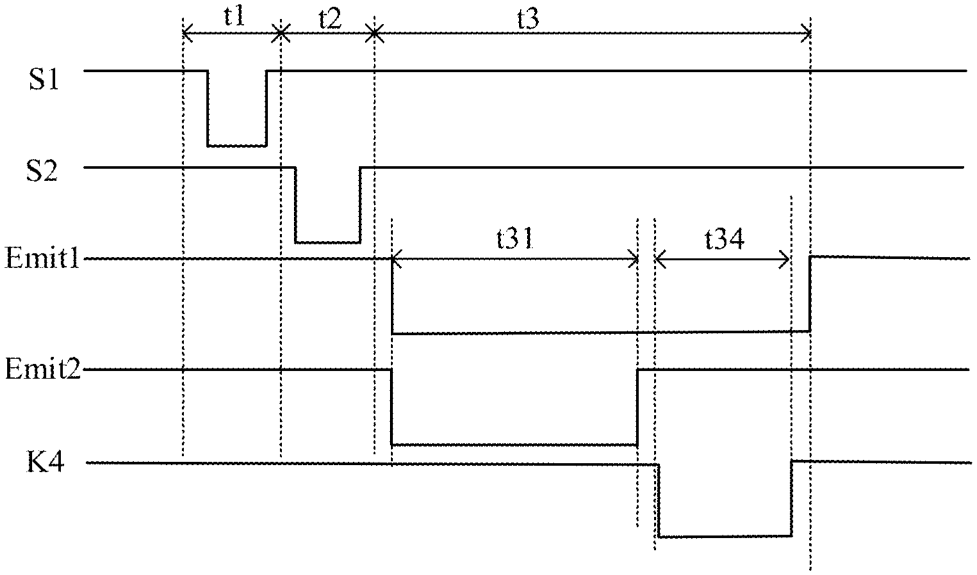
FIG. 15 is another signal timing diagram according to an embodiment of the present disclosure.

In other implementations, FIG. 14 is a schematic diagram of another pixel circuit according to an embodiment of the present disclosure, and FIG. 15 is another signal timing diagram according to an embodiment of the present disclosure. The pixel circuit provided by the embodiment of FIG. 14 can be driven by the signal timing diagram provided by the embodiment of FIG. 15. As shown in FIG. 14, both the control terminal of the first light-emitting control module 10 and the control terminal of the second light-emitting control module 20 in the first pixel circuit 01 receive the first control signal Emit 1. Both the control terminal of the first light-emitting control module 10 and the control terminal of the second light-emitting control module 20 in the second pixel circuit 02 receive the second control signal Emit 2. The first pixel circuit 01 further includes a third functional module 80. The third functional module 80 is connected between the second electrode of the drive transistor Tm and the first light-emitting device LD1. A control terminal of the third functional module 80 receives a fourth control signal K4. The third functional module 80 and the second light-emitting control module 20 are connected in parallel.

With reference to the timing diagram of FIG. 15, in the first mode, an effective pulse width of the first control signal Emit 1 is greater than an effective pulse width of the second control signal Emit 2. The working cycle of the first pixel circuit 01 includes a gate reset stage t1, a data writing stage t2, and a light-emitting stage t3. In the working cycle of the first pixel circuit 01: In at least one of periods when the first control signal Emit 1 provides the effective pulse and the second control signal Emit 2 provides a non-effective pulse, such as a period t34 in FIG. 15, the fourth control signal K4 provides an effective pulse, such that the third functional module 80 is turned on. In the period t34, the first light-emitting control module 10, the drive transistor Tm and the third functional module 80 form a light-emission channel. In this period, the first pixel circuit 01 can provide a driving current for the first light-emitting device LD1, such that the first light-emitting device LD1 emits light. In addition, in a period t31, both the first control signal Emit 1 and the second control signal Emit 2 provide the effective pulse. In this period, the first light-emitting control module 10, the drive transistor Tm and the second light-emitting control module 20 form a light-emission channel, such that the first light-emitting device LD1 emits light. In the working cycle of the first pixel circuit 01, the first light-emitting device LD1 emits the light in the period t31 and the period t34. For the second pixel circuit 02, both the first light-emitting control module 10 and the second light-emitting control module 20 are controlled by the second control signal Emit 2. That is, the light-emission channel is formed only in the period t31, such that the second light-emitting device LD2 emits light. In the implementation, in the first mode, a light-emission duration of the first light-emitting device LD1 is longer than a light-emission duration of the second light-emitting device LD2. This can compensate differences of the two light-emitting devices in luminous efficiency, and improve the color shift and the display effect of the display panel.

Optionally, as shown in FIG. 14, the third functional module 80 includes a third transistor T9. A control terminal of the third transistor T9 receives the fourth control signal K4. A first electrode of the third transistor T9 is connected to the second electrode of the drive transistor Tm. A second electrode of the third transistor T9 is connected to the first light-emitting device LD1. The third transistor T9 and the second light-emitting control transistor T6 have a same channel width and a same channel length.

In some implementations, as shown in FIG. 15, in the first mode, an effective pulse width of the fourth control signal K4 is less than the effective pulse width of the second control signal Emit 2. That is, a duration when the fourth control signal K4 provides an effective pulse is less than a duration when the second control signal Emit 2 provides the effective pulse. In the implementation, time that the second pixel circuit 02 provides a driving current is controlled by the second control signal Emit 2. The effective pulse width of the second control signal Emit 2 affects a light-emission duration of the second light-emitting device LD2. For the first pixel circuit 01, the period (period t31) when the second control signal Emit 2 provides the effective pulse can be understood as a first light-emitting stage of the first pixel circuit 01. The period (period t34) when the fourth control signal K4 provides the effective pulse can be understood as a second light-emitting stage of the first pixel circuit 01. In the implementation, the effective pulse width of the fourth control signal K4 is less than the effective pulse width of the second control signal Emit 2. In the first mode, the light-emission duration of the first light-emitting device LD1 can be increased with cooperation between the fourth control signal K4 and the first control signal Emit 1, and the second light-emitting device LD2 driven by the second pixel circuit 02 can also have the enough light-emission duration.

In an embodiment, in the display panel, the red light-emitting device is driven by the first pixel circuit 01 in FIG. 14, and the green light-emitting device and the blue light-emitting device are driven by the second pixel circuit 02 in FIG. 14. This can achieve a longer light-emission duration of the red light-emitting device, and compensate low luminous efficiency of the red light-emitting device, thereby improving color shift and display effect in applications.

Figure 16:
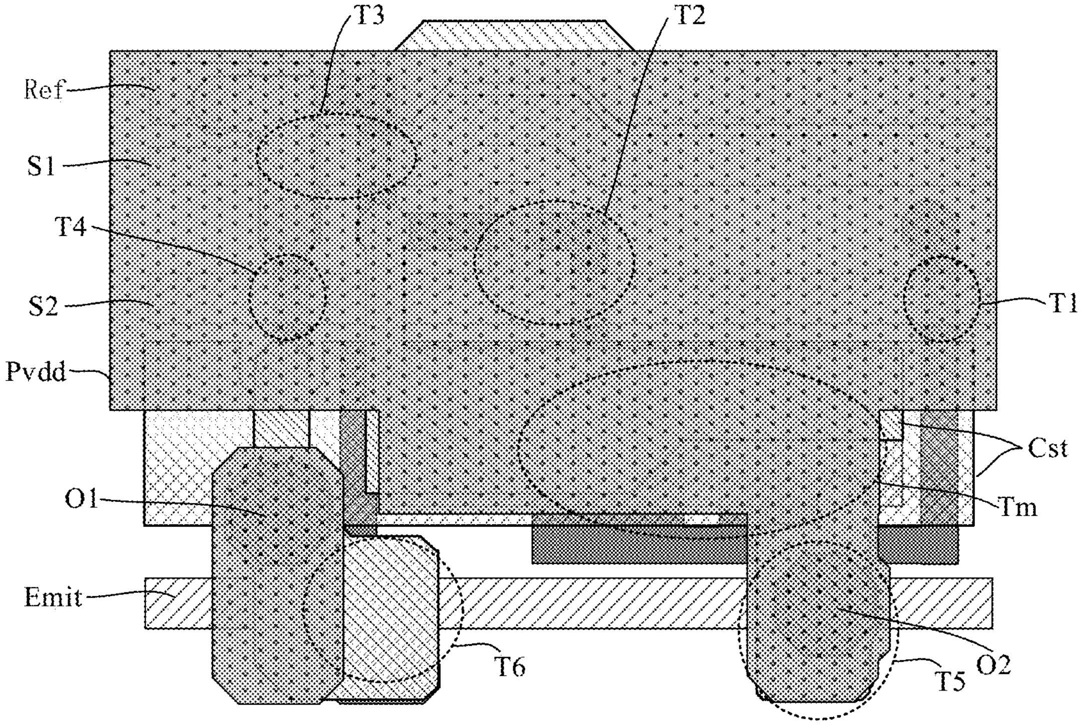
FIG. 16 is a schematic diagram of a display panel according to an embodiment of the present disclosure.
Figure 17:
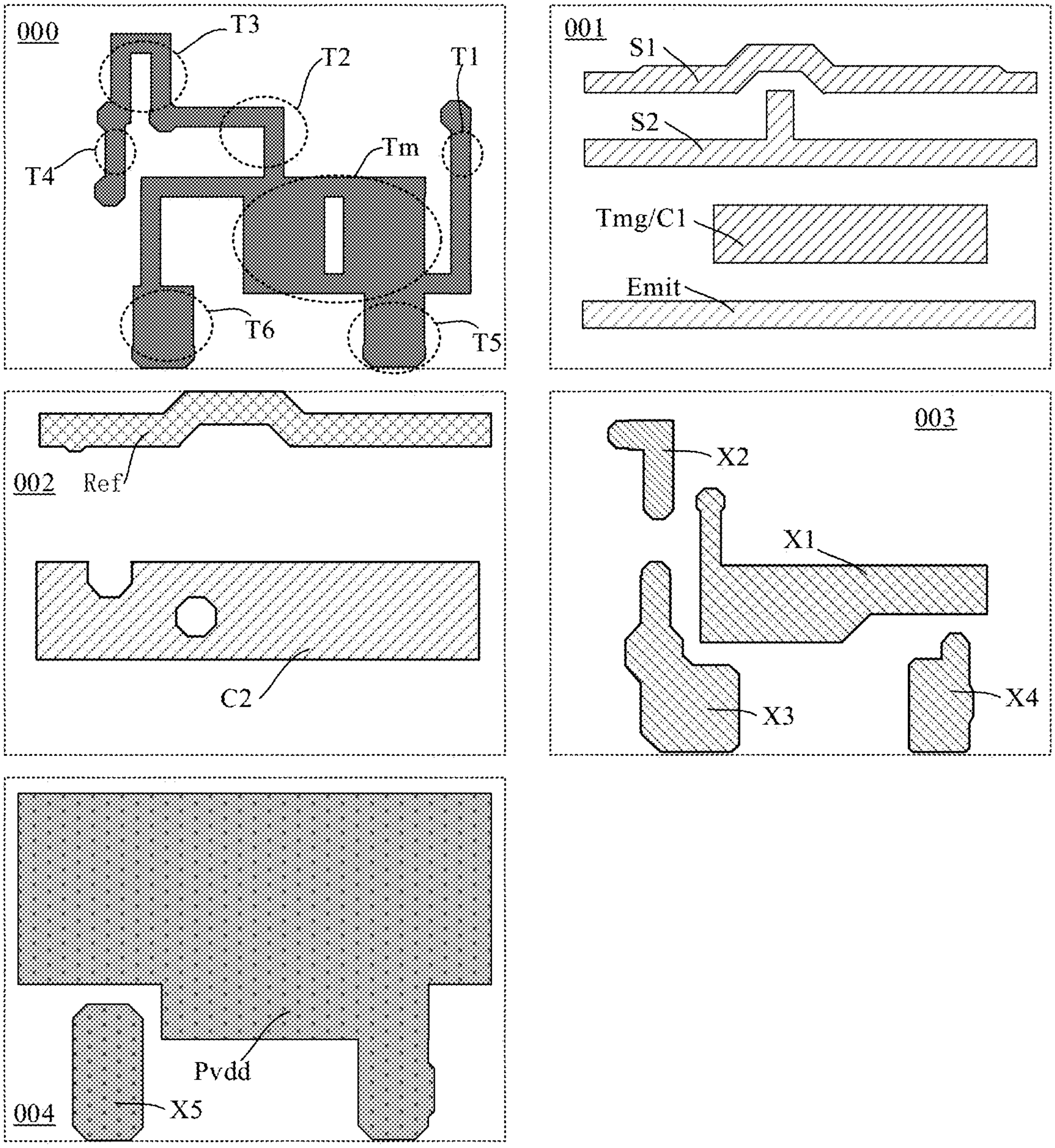
FIG. 17 is an exploded diagram of film layers shown in FIG. 16.

In some implementations, FIG. 16 is a schematic diagram of a display panel according to an embodiment of the present disclosure. FIG. 16 illustrates a region of one pixel circuit. FIG. 17 is an exploded diagram of film layers shown in FIG. 16. Descriptions are made with reference to the circuit diagram shown in FIG. 1 for understanding. As shown in FIG. 16, a first scanning line S1, a second scanning line S2, a light-emitting control line Emit, and a reset signal line Ref are arranged in the display panel. The first scanning line S1 provides a first scan signal S1. The second scanning line S2 provides a second scan signal S2. The light-emitting control line Emit provides a light-emitting control signal Emit. The reset signal line Ref serves as a reset signal terminal Ref, and provides a reset signal. The pixel circuit includes a drive transistor Tm, a data writing transistor T1, a compensation transistor T2, a gate reset transistor T3, an electrode reset transistor T4, a first light-emitting control transistor T5, a second light-emitting control transistor T6, and a storage capacitor Cst. FIG. 16 further illustrates a first power terminal Pvdd.

With reference to FIG. 17, the display panel at least includes a semiconductor layer 000, a first metal layer 001, a second metal layer 002, a third metal layer 003, and a fourth metal layer 004 that are located on a substrate. The semiconductor layer 000, the first metal layer 001, the second metal layer 002, the third metal layer 003, and the fourth metal layer 004 are provided sequentially away from the substrate. An active layer of each transistor is located on the semiconductor layer 000. FIG. 17 illustrates a position of each transistor in the semiconductor layer 000. As can be seen from FIG. 17, the drive transistor Tm is a parallel structure of two transistors in the implementation. This can increase a width-to-length ratio, and thus can increase a driving current.

The first scanning line S1, the second scanning line S2, and the light-emitting control line Emit are located on the first metal layer 001. A gate of each transistor is located on the first metal layer 001. FIG. 17 illustrates a gate Tmg of the drive transistor Tm. The gate Tmg of the drive transistor Tm is multiplexed as one electrode plate C1 of the storage capacitor Cst. The other electrode plate C2 of the storage capacitor Cst is located on the second metal layer 002. The reset signal line Ref is located on the second metal layer 002. A plurality of connecting lines, such as a first connecting line X1 for connecting the gate reset transistor T3 to the gate Tmg of the drive transistor Tm, a second connecting line X2 for connecting the gate reset transistor T3 to the reset signal line Ref, a third connecting line X3 connected to the second light-emitting control transistor T6, and a fourth connecting line X4 connected to the first light-emitting control transistor T5, are arranged on the third metal layer 003. The third connecting line X3 is electrically connected to a connecting electrode X5 through a first via hole 01. The connecting electrode X5 is connected to a light-emitting device. Through the third connecting electrode X3, the second light-emitting control transistor T6 is coupled to the light-emitting device. The fourth connecting line X4 is connected to the first power terminal Pvdd through a second via hole 02. The first power terminal Pvdd and the connecting electrode X5 are located on the fourth metal layer 004.

Figure 18:
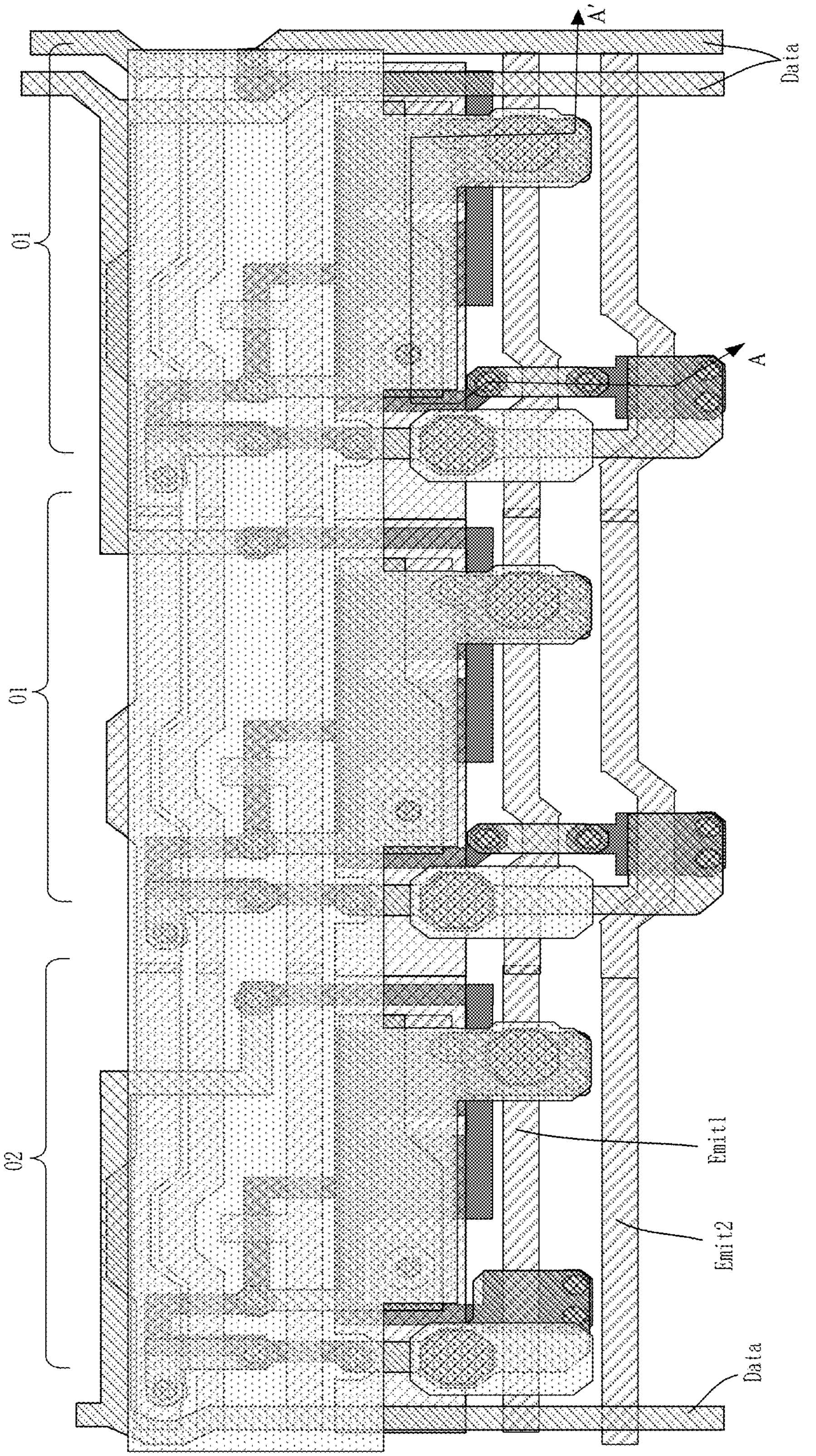
FIG. 18 is a partial schematic diagram of a display panel according to an embodiment of the present disclosure.

In an embodiment, FIG. 18 is a partial schematic diagram of a display panel according to an embodiment of the present disclosure. FIG. 18 illustrates a region of a pixel cell. The pixel cell includes two first pixel circuits 01 and one second pixel circuit 02. The structure of the first pixel circuit 01 and the second pixel circuit 02 may be understood with reference to FIG. 16 and FIG. 17. The pixel circuit shown in the embodiment of FIG. 3 may be applied to the display panel provided by the embodiment of FIG. 18. As shown in FIG. 18, in the second pixel circuit 02, both a control terminal (gate) of the first light-emitting control transistor T5 and a control terminal of the second light-emitting control transistor T6 are connected to the first control line Emit 1. The first control line Emit 1 provides the first control signal Emit 1. In the first pixel circuit 01, the control terminal of the first light-emitting control transistor T5 is connected to the first control line Emit 1, the control terminal of the second light-emitting control transistor T6 is connected to the second control line Emit 2, and the second control line Emit 2 provides the second control signal Emit 2. The second pixel circuit 02 is coupled to a red light-emitting device. In the two first pixel circuits 01, one first pixel circuit is coupled to a green light-emitting device, and the other first pixel circuit is connected to a blue light-emitting device. FIG. 18 further illustrates a data line Data. The data line Data provides a data signal. The data line Data is located on the third metal layer 003.

Figure 19:
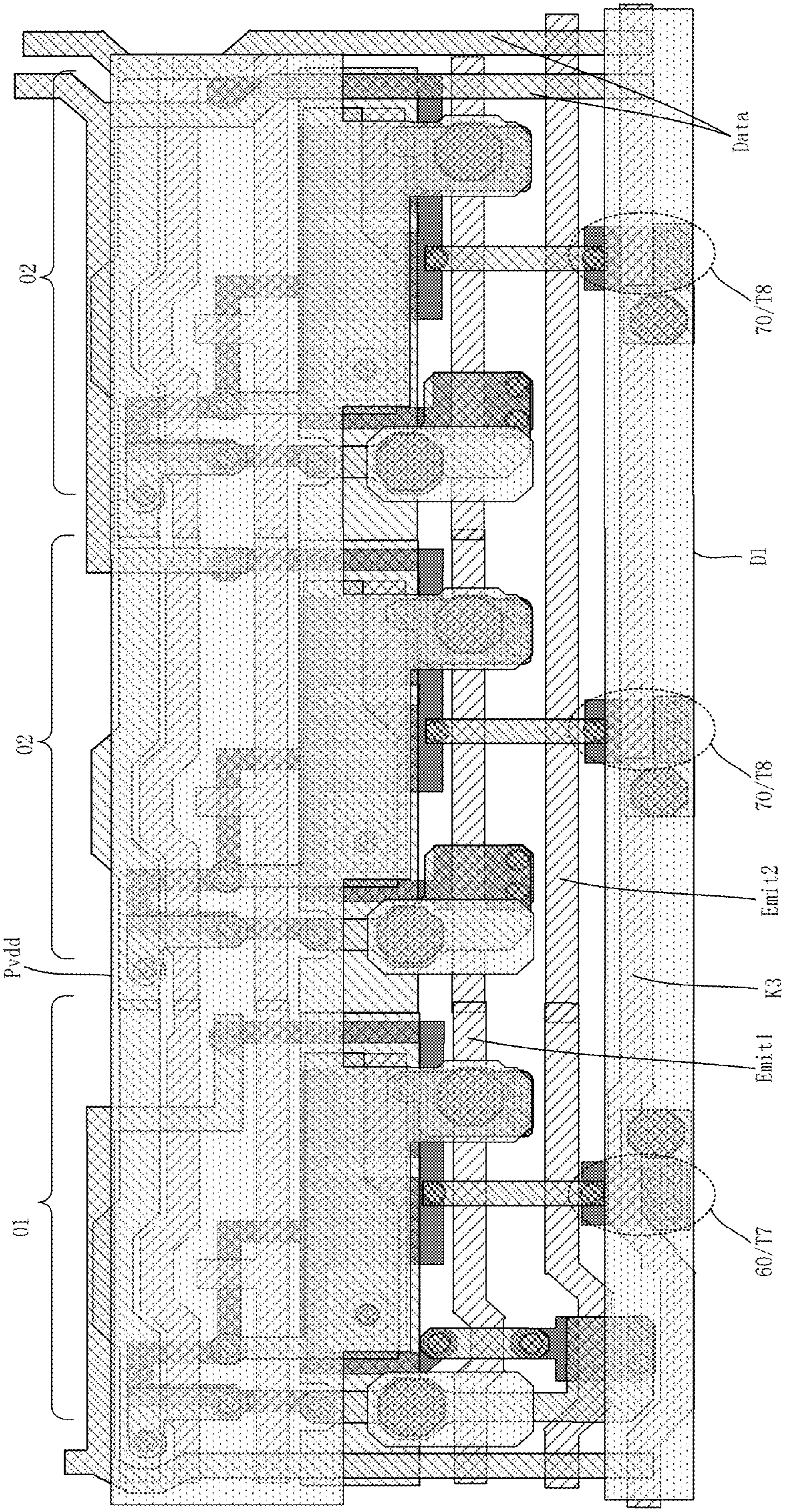
FIG. 19 is a partial schematic diagram of another display panel according to an embodiment of the present disclosure.

In another embodiment, FIG. 19 is a partial schematic diagram of another display panel according to an embodiment of the present disclosure. FIG. 19 illustrates a region of a pixel cell. The pixel cell includes one first pixel circuits 01 and two second pixel circuits 02. Positions of the transistor in the first pixel circuit 01 and the second pixel circuit 02 may be understood with reference to FIG. 16 and FIG. 17. The pixel circuit shown in the embodiment of FIG. 12 may be applied to the display panel provided by the embodiment of FIG. 19. As shown in FIG. 19, the first pixel circuit 01 includes a first functional module 60. The first functional module 60 includes a first transistor T7. The second pixel circuit 02 includes a second functional module 70. The second functional module 70 includes a second transistor T8. In the second pixel circuit 02, both a control terminal of the first light-emitting control transistor T5 and a control terminal of the second light-emitting control transistor T6 are connected to the first control line Emit 1. The first control line Emit 1 provides the first control signal Emit 1. In the first pixel circuit 01, the control terminal of the first light-emitting control transistor T5 is connected to the first control line Emit 1, the control terminal of the second light-emitting control transistor T6 is connected to the second control line Emit 2, and the second control line Emit 2 provides the second control signal Emit 2. A control terminal of the first functional module 60 and a control terminal of the second functional module 70 are connected to the third control line K3. The third control line K3 provides the third control signal K3. FIG. 19 further illustrates a first power terminal Pvdd and a first signal terminal D1. The first pixel circuit 01 is coupled to a red light-emitting device. In the two second pixel circuits 02, one second pixel circuit is coupled to a green light-emitting device, and the other second pixel circuit is connected to a blue light-emitting device. In FIG. 19, the third control line K3 is located on the first metal layer 001. The first power terminal Pvdd and the first signal terminal D1 are located on a same layer.

Figure 20:
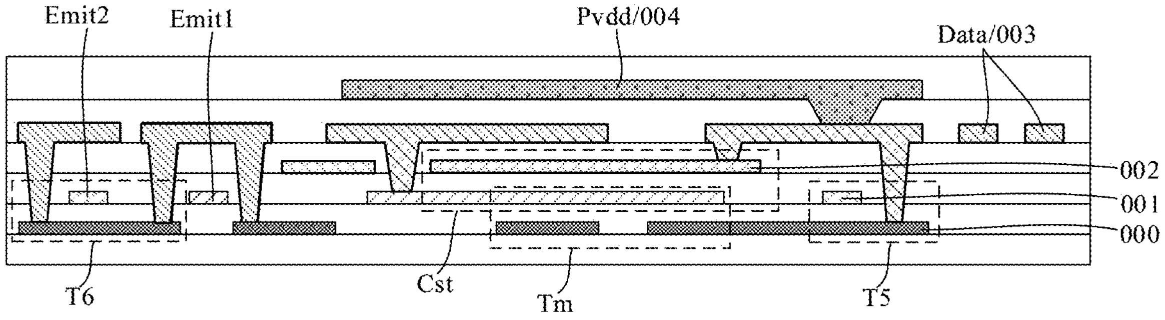
FIG. 20 is a schematic cross-sectional diagram along a line A-A' shown in FIG. 18.

FIG. 20 is a schematic cross-sectional diagram along a line A-A' shown in FIG. 18. FIG. 20 illustrates the drive transistor Tm, the first light-emitting control transistor T5, the second light-emitting control transistor T6, and the storage capacitor Cst, as well as the first control line Emit 1, the second control line Emit 2, the data line Data, and the first power terminal Pvdd. With reference to FIG. 17, the active layer of the transistor is located on the semiconductor layer 000. The first control line Emit 1 and the second control line Emit 2 are located on the first metal layer 001. One electrode plate of the storage capacitor Cst is located on the second metal layer 002. The data line Data is located on the third metal layer 003. The first power terminal Pvdd is located on the fourth metal layer 004.

Figure 21:
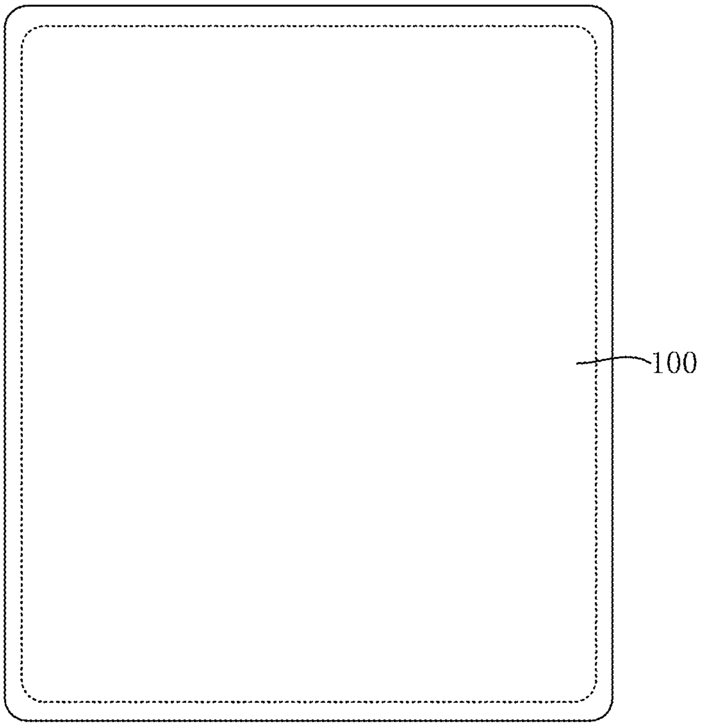
FIG. 21 is a schematic diagram of a display apparatus according to an embodiment of the present disclosure.

Based on a same inventive concept, an embodiment of the present disclosure further provides a display apparatus. FIG. 21 is a schematic diagram of a display apparatus according to an embodiment of the present disclosure. As shown in FIG. 21, the display apparatus includes the display panel 100 provided in any embodiment of the present disclosure. The structure of the display panel has been described in the foregoing embodiments, and details are not repeated. The display apparatus provided in the embodiment of the present disclosure may be, for example, an electronic device such as a mobile phone, a computer, a tablet, a television, and a transparent display device.

The above descriptions are merely preferred embodiments of the present disclosure, and are not intended to limit the present disclosure. Any modifications, equivalent replacements, improvements, and the like made within the spirit and principle of the present disclosure shall fall within the protection scope of the present disclosure.

Finally, it should be noted that the foregoing embodiments are merely intended to describe and not to limit the technical solutions of the present disclosure. Although the present disclosure has been described in detail with reference to the foregoing embodiments, persons skilled in the art should understand that they can still make modifications to the technical solutions described in the foregoing embodiments or make equivalent replacements to some or all of the technical features thereof. These modifications or replacements do not make the essence of the corresponding technical solutions deviate from the scope of the technical solutions of the embodiments of the present disclosure.

What is claimed is:

1. A display panel, comprising pixel circuits and light-emitting devices, wherein one pixel circuit of the pixel circuits comprises a drive transistor, a first light-emitting control module, and a second light-emitting control module; the drive transistor comprises a first electrode coupled to a first power terminal through the first light-emitting control module, and a second electrode coupled to one of the plurality of light-emitting devices through the second light-emitting control module;

wherein the pixel circuits comprise a first pixel circuit and a second pixel circuit; in the first pixel circuit, a control terminal of the first light-emitting control module receives a first control signal, and a control terminal of the second light-emitting control module receives a second control signal; and in the second pixel circuit, a control terminal of the first light-emitting control module and a control terminal of the second light-emitting control module receive the first control signal or receive the second control signal; and wherein the display panel has a first mode; in the first mode, the first control signal and the second control signal are different control signals; and in a working cycle of the first pixel circuit, an effective pulse period of the first control signal partially overlaps with an effective pulse period of the second control signal.

2. The display panel according to claim 1, wherein the control terminal of the first light-emitting control module and the control terminal of the second light-emitting control module in the second pixel circuit receive the first control signal, respectively;

in the first mode, an effective pulse width of the first control signal is smaller than an effective pulse width of the second control signal;

the first pixel circuit further comprises a first functional module; the first functional module is connected between the first electrode of the drive transistor and a first signal terminal; and a control terminal of the first functional module receives a third control signal; and in the working cycle of the first pixel circuit: in at least one of periods that the first control signal provides a non-effective pulse and the second control signal provides the effective pulse, the third control signal provides a first effective pulse, such that the first functional module is turned on to write a first signal from the first signal terminal into the first electrode of the drive transistor.

3. The display panel according to claim 2, wherein the plurality of light-emitting devices comprise a first light-emitting device and a second light-emitting device; the first light-emitting device is coupled to the first pixel circuit; and the second light-emitting device is coupled to the second pixel circuit; and a wavelength of light emitted by the first light-emitting device is greater than a wavelength of light emitted by the second light-emitting device.

4. The display panel according to claim 2, wherein a falling edge of the first effective pulse is after a rising edge of the effective pulse of the first control signal.

5. The display panel according to claim 4, wherein a duration of the first effective pulse $m_1$ is greater than an interval $m_2$ between the falling edge of the first effective pulse and the rising edge of the effective pulse of the first control signal.

6. The display panel according to claim 2, wherein a duration of the first effective pulse $m_1$ is smaller than a duration $m_3$ of the effective pulse of the first control signal.

7. The display panel according to claim 2, wherein the display panel further has a second mode; and in the second mode, the first control signal and the second control signal are different control signals;

the effective pulse width of the second control signal in the first mode is smaller than an effective pulse width of the second control signal in the second mode, and a pulse width of the first effective pulse in the first mode is smaller than or equal to a pulse width of the first effective pulse in the second mode; and an overlap duration $m_4$ for the effective pulse of the second control signal and the first effective pulse in the first mode is smaller than an overlap duration $m_5$ for the effective pulse of the second control signal and the first effective pulse in the second mode.

8. The display panel according to claim 2, wherein the display panel further comprises a second mode; and in the second mode, the first control signal and the second control signal are different control signals;

the effective pulse width of the second control signal in the first mode is the same as an effective pulse width of the second control signal in the second mode, and a pulse width of the first effective pulse in the first mode is smaller than a pulse width of the first effective pulse in the second mode; and an overlap duration $m_4$ for the effective pulse of the second control signal and the first effective pulse in the first mode is smaller than an overlap duration $m_5$ for the effective pulse of the second control signal and the first effective pulse in the second mode.

9. The display panel according to claim 2, wherein the second pixel circuit further comprises a second functional module; and the second functional module is connected between the first electrode of the drive transistor and a second signal terminal; and in a working cycle of the second pixel circuit: in at least one of periods that the first control signal provides a non-effective pulse, the second functional module is turned on to write a second signal from the second signal terminal into the first electrode of the drive transistor.

10. The display panel according to claim 9, wherein the second signal terminal and the first signal terminal provide a same signal.

11. The display panel according to claim 9, wherein a control terminal of the second functional module and the control terminal of the first functional module receive a same signal.

12. The display panel according to claim 11, wherein the working cycle of the second pixel circuit comprises a data writing stage; and in the working cycle of the second pixel circuit, the data writing stage is prior to the first control signal provides the effective pulse; and before the data writing stage, the third control signal provides a second effective pulse, such that the second functional module is turned on to write a second pre-charge signal from the second signal terminal into the first electrode of the drive transistor.

13. The display panel according to claim 2, wherein the working cycle of the first pixel circuit comprises a data writing stage; and in the working cycle of the first pixel circuit, the data writing stage is prior to the second control signal provides the effective pulse; and before the data writing stage, the third control signal provides a second effective pulse, such that the first functional module is turned on to write a first pre-charge signal from the first signal terminal into the first electrode of the drive transistor.

14. The display panel according to claim 13, wherein the first pre-charge signal is a constant voltage signal.

15. The display panel according to claim 14, wherein a voltage of the first pre-charge signal is greater than a voltage of the first signal.

16. The display panel according to claim 13, wherein the first power terminal provides a first power signal; and a voltage of the first pre-charge signal is greater than a voltage of the first power signal.

17. The display panel according to claim 13, wherein the pixel circuit further comprises a gate reset module; the gate reset module is connected between a reset signal terminal and a gate of the drive transistor; and a control terminal of the gate reset module receives a first scan signal; and in the working cycle of the first pixel circuit, the first scan signal provides an effective pulse, such that the gate reset module is turned on to write a reset signal into the gate of the drive transistor; and a period in which the third control signal provides the second effective pulse at least partially overlaps with a period in which the first scan signal provides the effective pulse.

18. The display panel according to claim 17, wherein in the working cycle of the first pixel circuit, starting time point from which the third control signal provides the second effective pulse coincides with starting time point from which the first scan signal provides the effective pulse, and ending time point from which the third control signal provides the second effective pulse coincides with ending time point from which the first scan signal provides the effective pulse.

19. The display panel according to claim 13, wherein a pulse width of the second effective pulse is smaller than a pulse width of the first effective pulse.

20. A display apparatus, comprising a display panel, wherein the display panel, comprises pixel circuits and light-emitting devices, wherein each pixel circuit of the pixel circuits comprises a drive transistor, a first light-emitting control module, and a second light-emitting control module; the drive transistor comprises a first electrode coupled to a first power terminal through the first light-emitting control module, and a second electrode coupled to one of the plurality of light-emitting devices through the second light-emitting control module;

wherein the pixel circuits comprise a first pixel circuit and a second pixel circuit; in the first pixel circuit, a control terminal of the first light-emitting control module receives a first control signal, and a control terminal of the second light-emitting control module receives a second control signal; and in the second pixel circuit, a control terminal of the first light-emitting control module and a control terminal of the second light-emitting control module receive the first control signal or receive the second control signal; and wherein the display panel has a first mode; in the first mode, the first control signal and the second control signal are different control signals; and in a working cycle of the first pixel circuit, an effective pulse period of the first control signal partially overlaps with an effective pulse period of the second control signal.

* * * * *